(12) United States Patent
Chun et al.

(10) Patent No.: US 10,548,146 B2
(45) Date of Patent: Jan. 28, 2020

(54) CHANNEL SOUNDING METHOD IN WIRELESS COMMUNICATION SYSTEM AND DEVICE FOR SAME

(71) Applicant: LG ELECTRONICS INC., Seoul (KR)

(72) Inventors: Jinyoung Chun, Seoul (KR); Kiseon Ryu, Seoul (KR); Dongguk Lim, Seoul (KR); Wookbong Lee, Seoul (KR); Jinsoo Choi, Seoul (KR); Hangyu Cho, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 15/566,596

(22) PCT Filed: Apr. 15, 2016

(86) PCT No.: PCT/KR2016/003965
§ 371 (c)(1),
(2) Date: Oct. 13, 2017

(87) PCT Pub. No.: WO2016/167609
PCT Pub. Date: Oct. 20, 2016

(65) Prior Publication Data
US 2018/0359761 A1 Dec. 13, 2018

Related U.S. Application Data

(60) Provisional application No. 62/266,721, filed on Dec. 14, 2015, provisional application No. 62/209,899, (Continued)

(51) Int. Cl.
*H04W 72/08* (2009.01)
*H04W 72/04* (2009.01)
(Continued)

(52) U.S. Cl.
CPC ..... *H04W 72/085* (2013.01); *H04W 72/0413* (2013.01); *H04W 72/0446* (2013.01);
(Continued)

(58) Field of Classification Search
CPC ........... H04W 72/085; H04W 72/0446; H04W 72/0413; H04W 84/12; H04W 72/121;
(Continued)

(56) References Cited

U.S. PATENT DOCUMENTS

2011/0075607 A1* 3/2011 Kim ...................... H04B 7/0417
370/328
2016/0119902 A1* 4/2016 Cheong ................. H04W 48/12
370/329
(Continued)

FOREIGN PATENT DOCUMENTS

KR  10-2013-0079550 A  7/2013
WO  2011/108832 A2  9/2011
(Continued)

*Primary Examiner* — Ivan O Latorre
(74) *Attorney, Agent, or Firm* — Dentons US LLP

(57) ABSTRACT

An uplink (UL) sounding support method of a station (STA) for measuring a an UL channel state in a wireless local area network (WLAN) system, according to one embodiment of the present invention, comprises the steps of: receiving null data packet announcement (NDPA) information indicating an UL transmission of an the NDP frame; receiving trigger information indicating an UL MU transmission resource of the NDP frame; and UL multi-user (MU)-transmitting the NDP frame using the UL MU transmission resource indicated by the trigger information, wherein the trigger information may comprise at least one of spatial resource information or the frequency resource information to be used for the UL MU transmission of the NDP frame.

15 Claims, 33 Drawing Sheets

Related U.S. Application Data filed on Aug. 26, 2015, provisional application No. 62/148,184, filed on Apr. 16, 2015.

(51) Int. Cl.
*H04W 72/12* (2009.01)
*H04W 84/12* (2009.01)

(52) U.S. Cl.
CPC ...... *H04W 72/046* (2013.01); *H04W 72/0453* (2013.01); *H04W 72/121* (2013.01); *H04W 84/12* (2013.01)

(58) Field of Classification Search
CPC .. H04W 72/046; H04W 72/0453; H04L 5/00; H04L 27/2602
See application file for complete search history.

(56) References Cited

U.S. PATENT DOCUMENTS

| | | | |
|---|---|---|---|
| 2016/0143026 A1* | 5/2016 | Seok | H04W 72/0413 370/329 |
| 2016/0233932 A1* | 8/2016 | Hedayat | H04B 7/0421 |
| 2016/0242195 A1* | 8/2016 | Kwon | H04W 72/121 |
| 2016/0261327 A1* | 9/2016 | Merlin | H04W 72/0413 |
| 2017/0013607 A1* | 1/2017 | Cariou | H04W 74/004 |

FOREIGN PATENT DOCUMENTS

| | | | | |
|---|---|---|---|---|
| WO | 20140182137 A1 | | 11/2014 | |
| WO | WO2014182137 | * | 11/2014 | ........... H04B 17/309 |
| WO | 2015034304 A1 | | 3/2015 | |
| WO | 2015037914 A1 | | 3/2015 | |

* cited by examiner

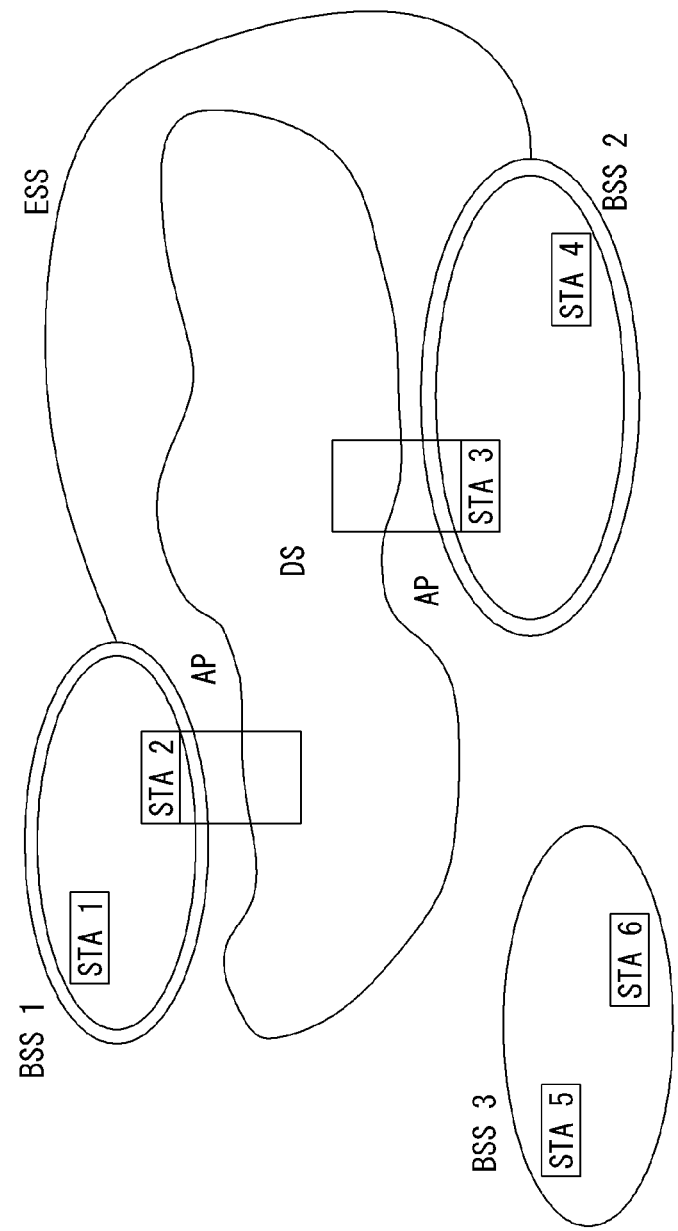
[FIG. 1]

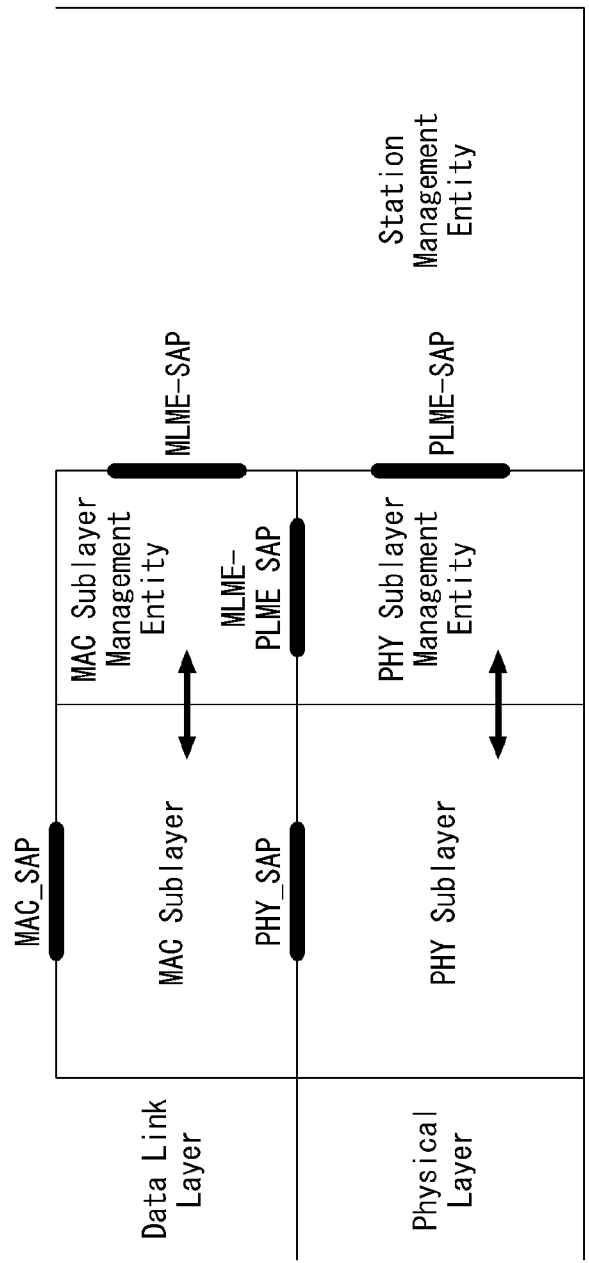
[FIG. 2]

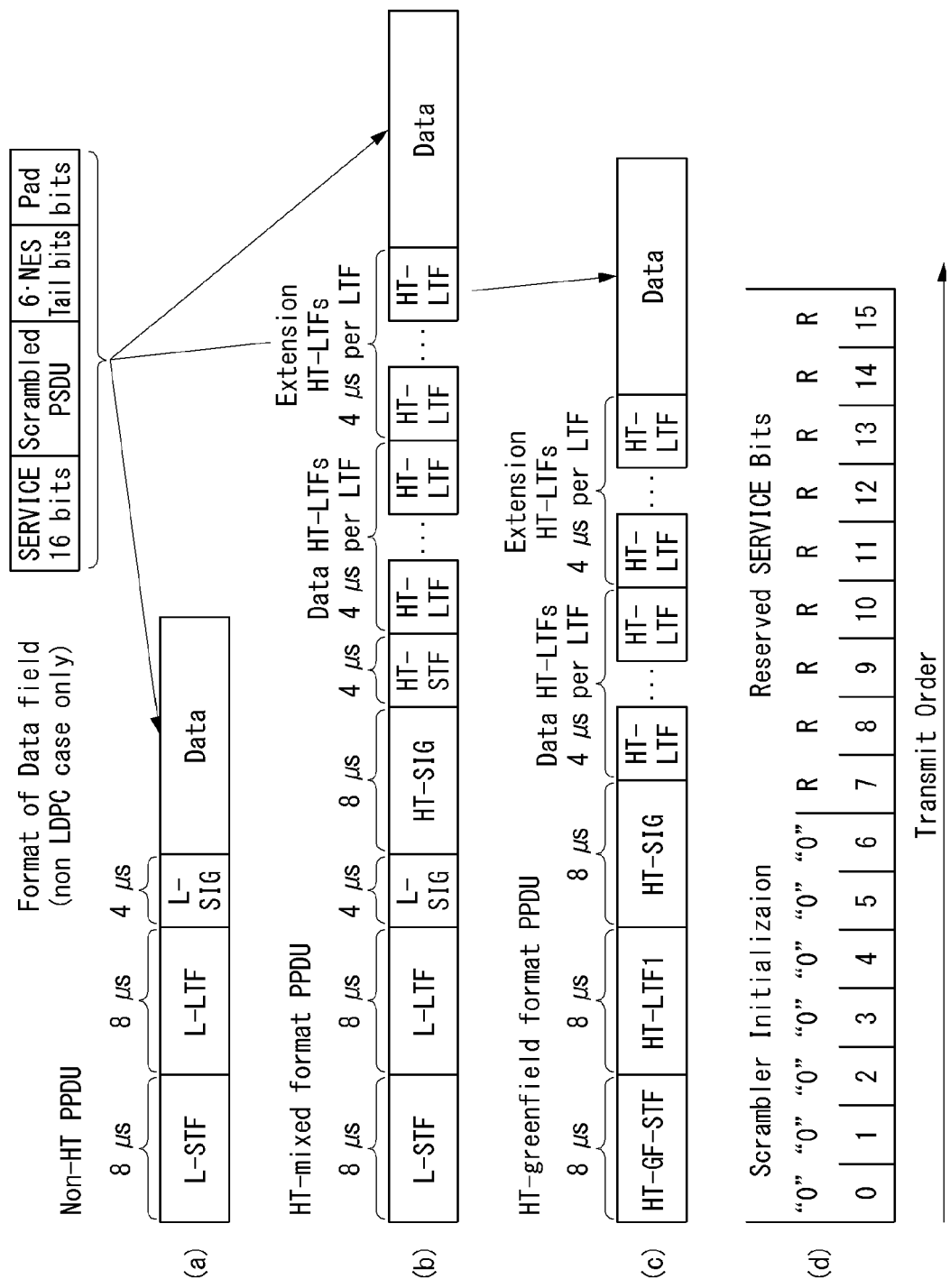
[FIG. 3]

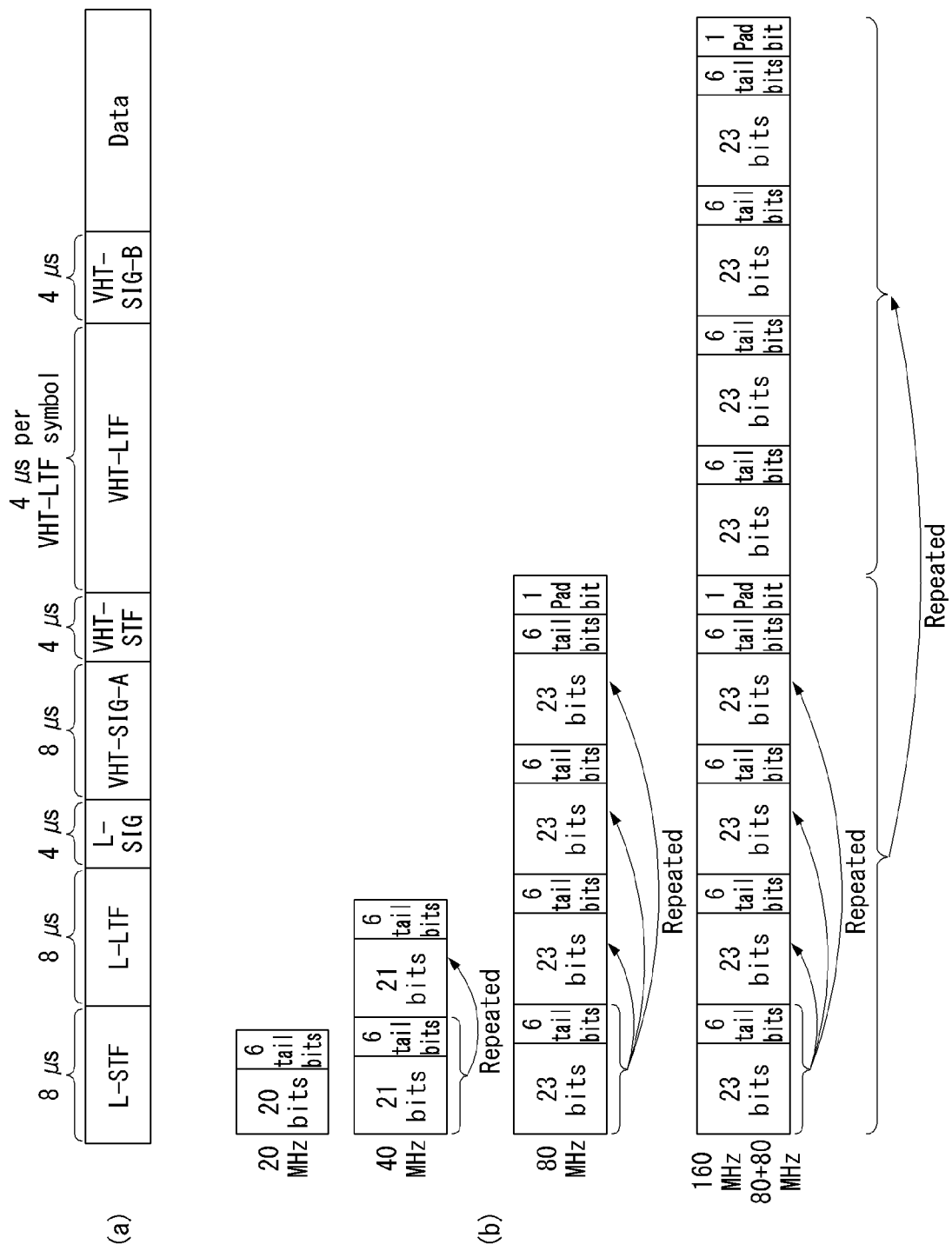

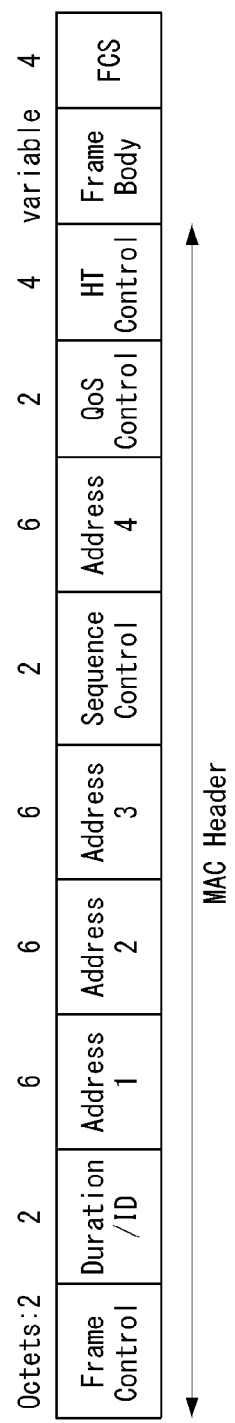
[FIG. 5]

[FIG. 6]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag-ments | Retry | Power Management | More Data | Protected Frame | Order |
| 2 | 2 | 4 | 1 | 1 | 1 | 1 | 1 | 1 | 1 | 1 |

Bits:

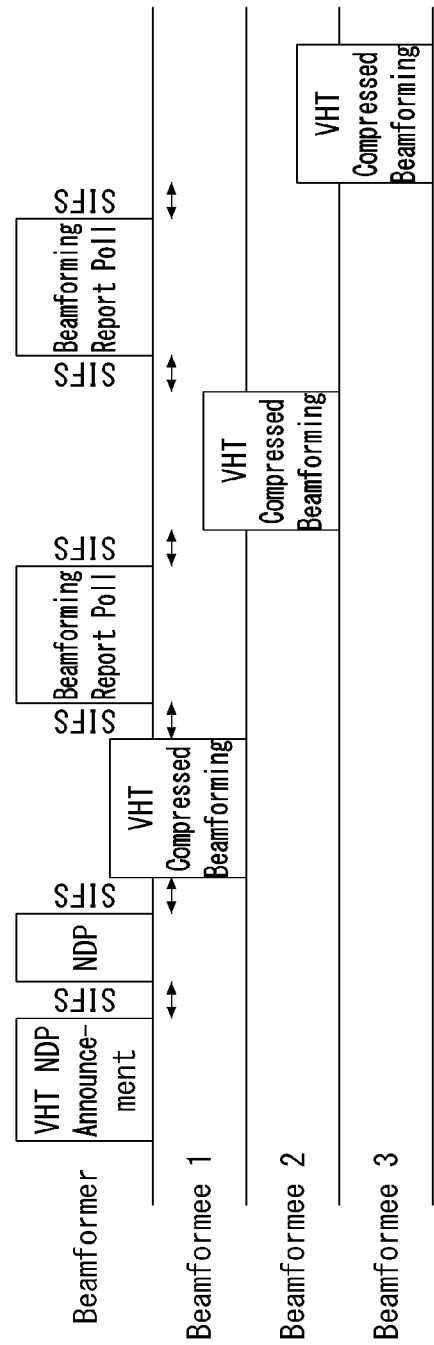
[FIG. 7]

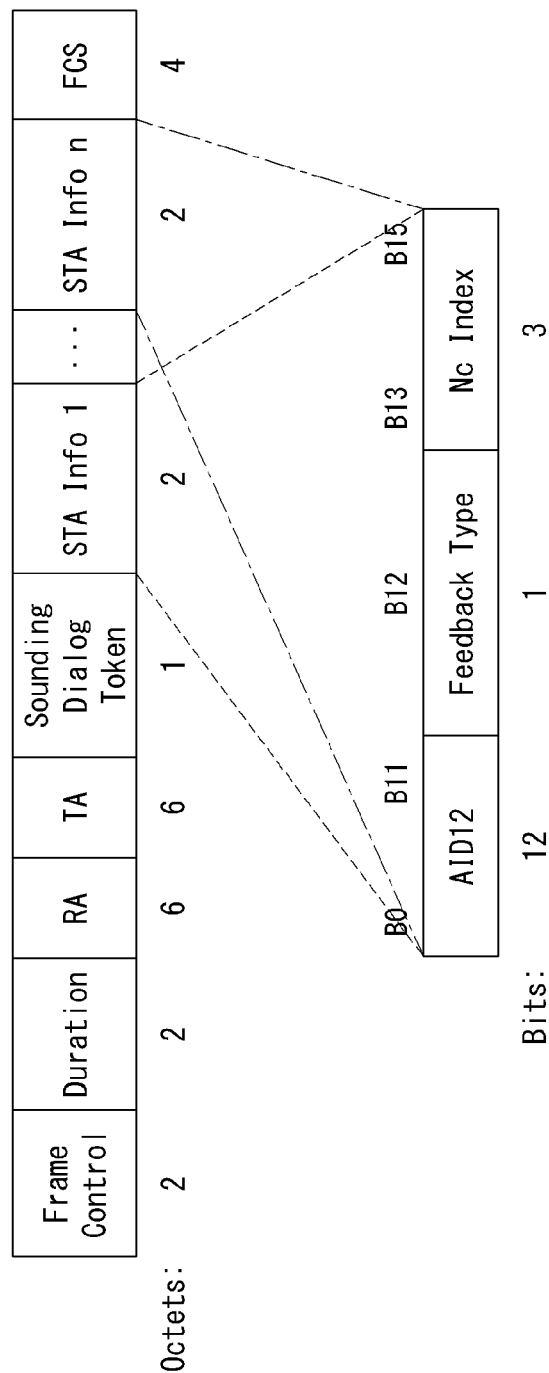
[FIG. 8]

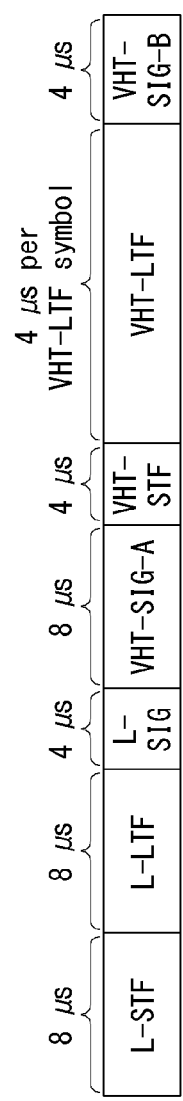
[FIG. 9]

[FIG. 10]
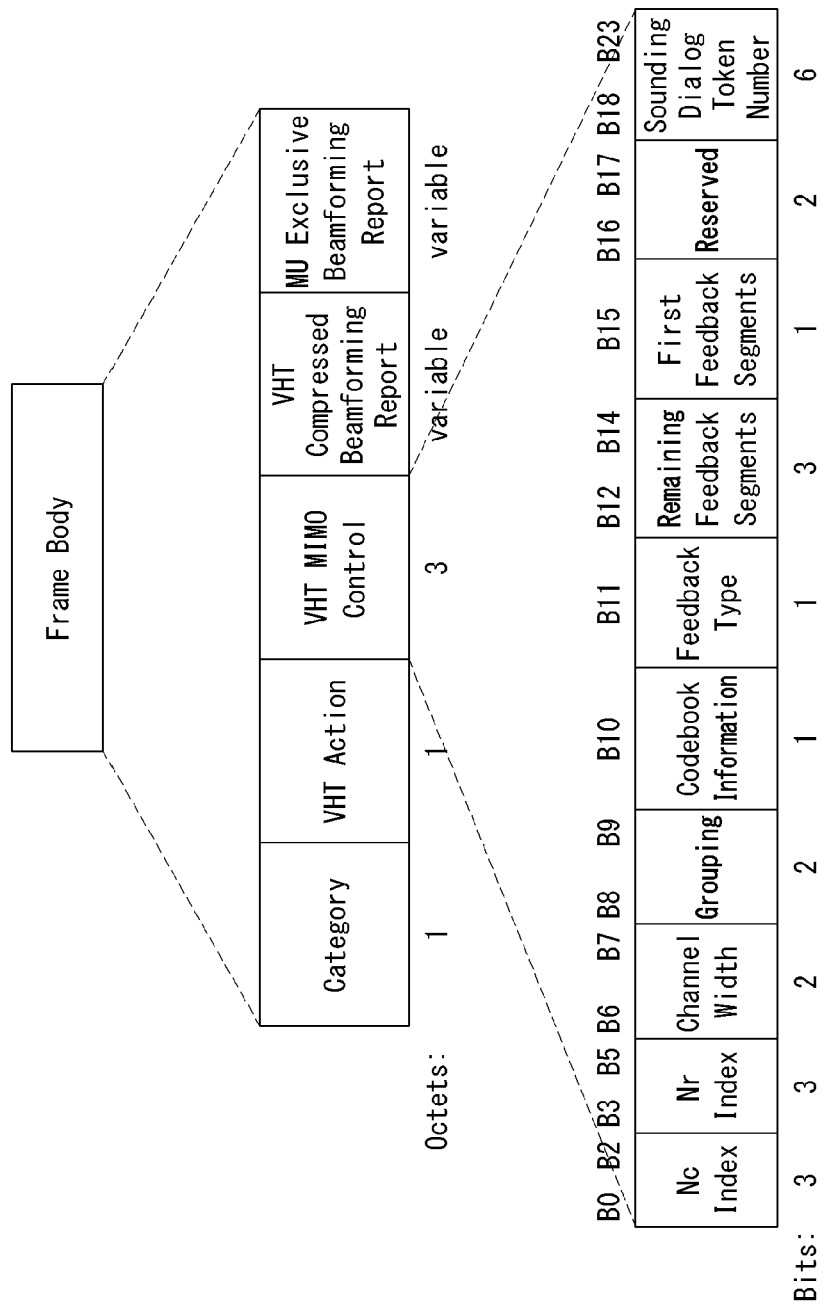

[FIG. 11]

| Frame Control | Duration | RA | TA | Feedback Segment Retransmission Bitmap | FCS |
|---|---|---|---|---|---|
| 2 | 2 | 6 | 6 | 1 | 4 |

Octets:

[FIG. 12]
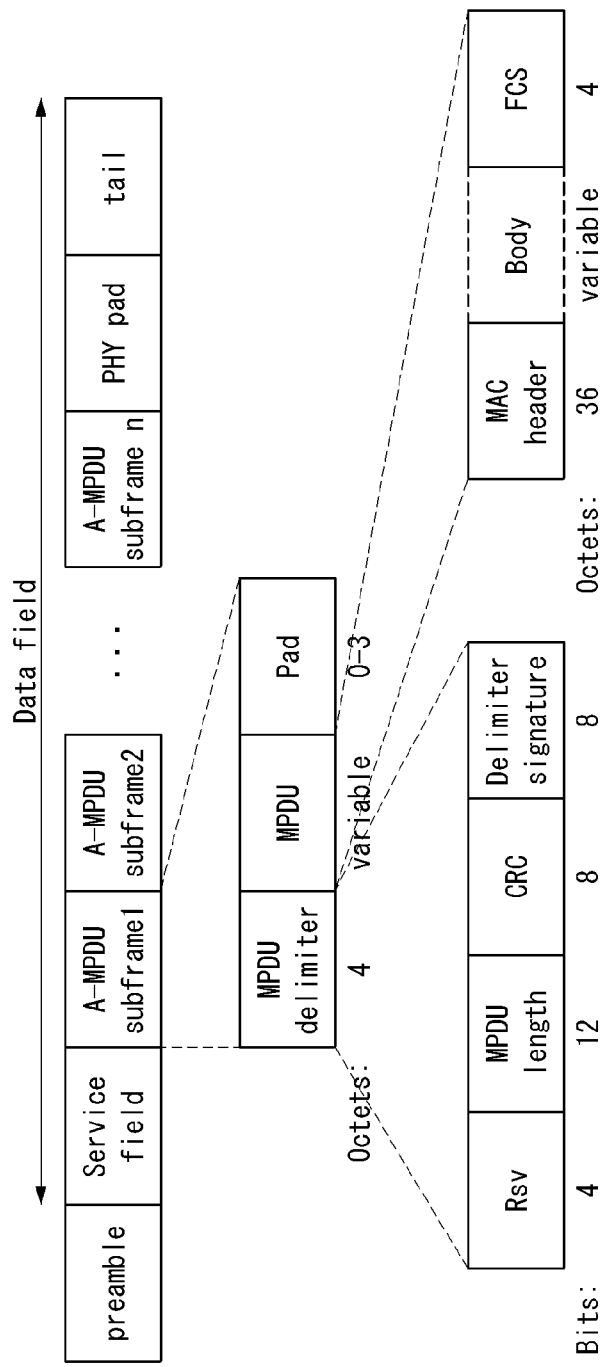

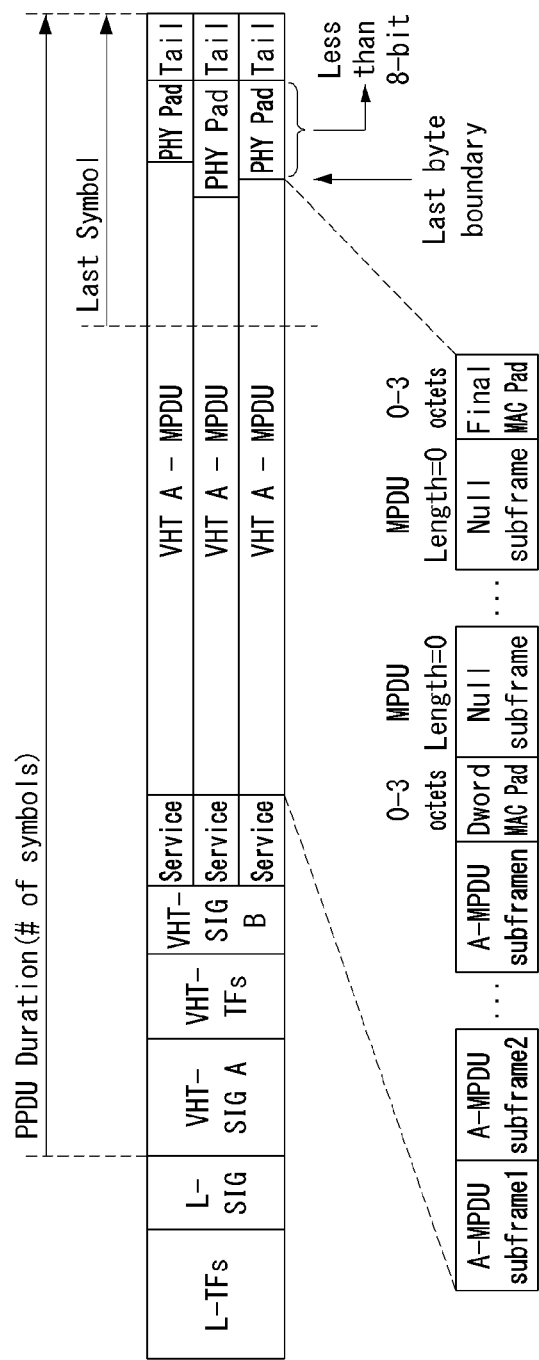
[FIG. 13]

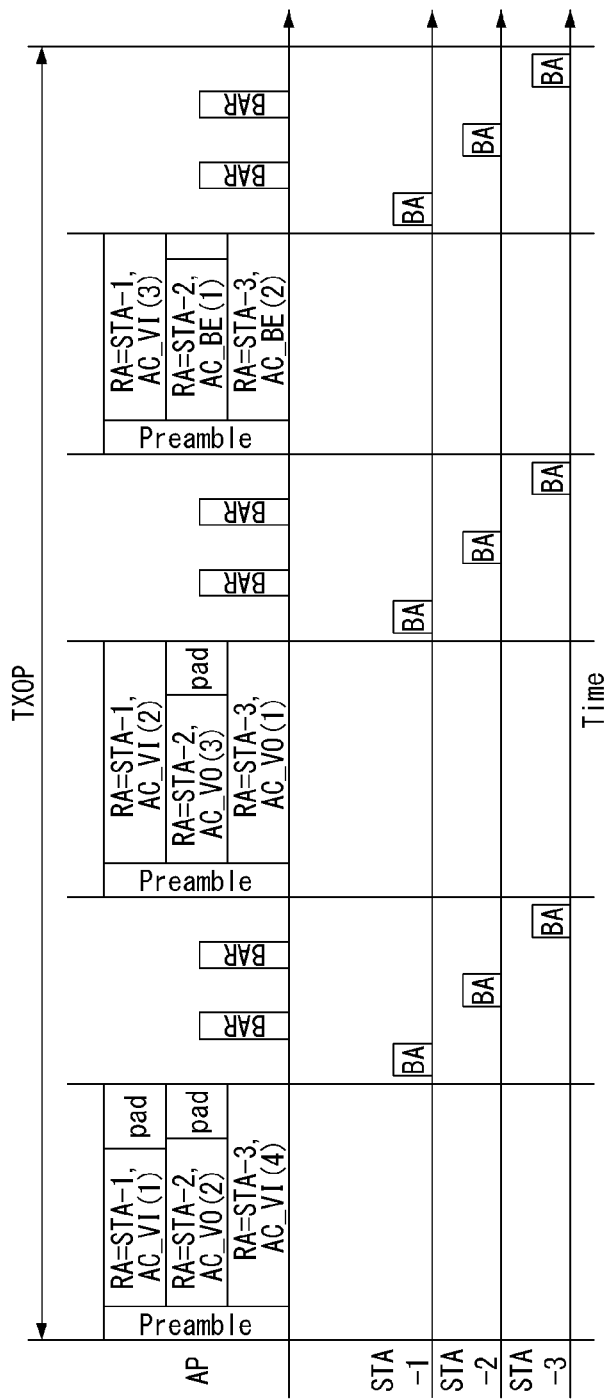

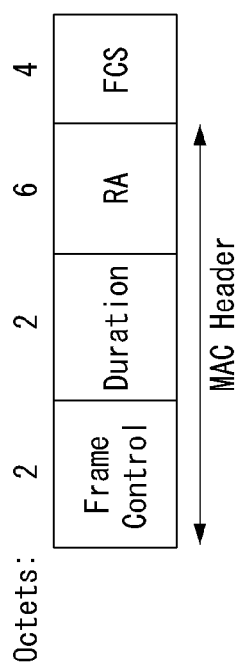
[FIG. 15]

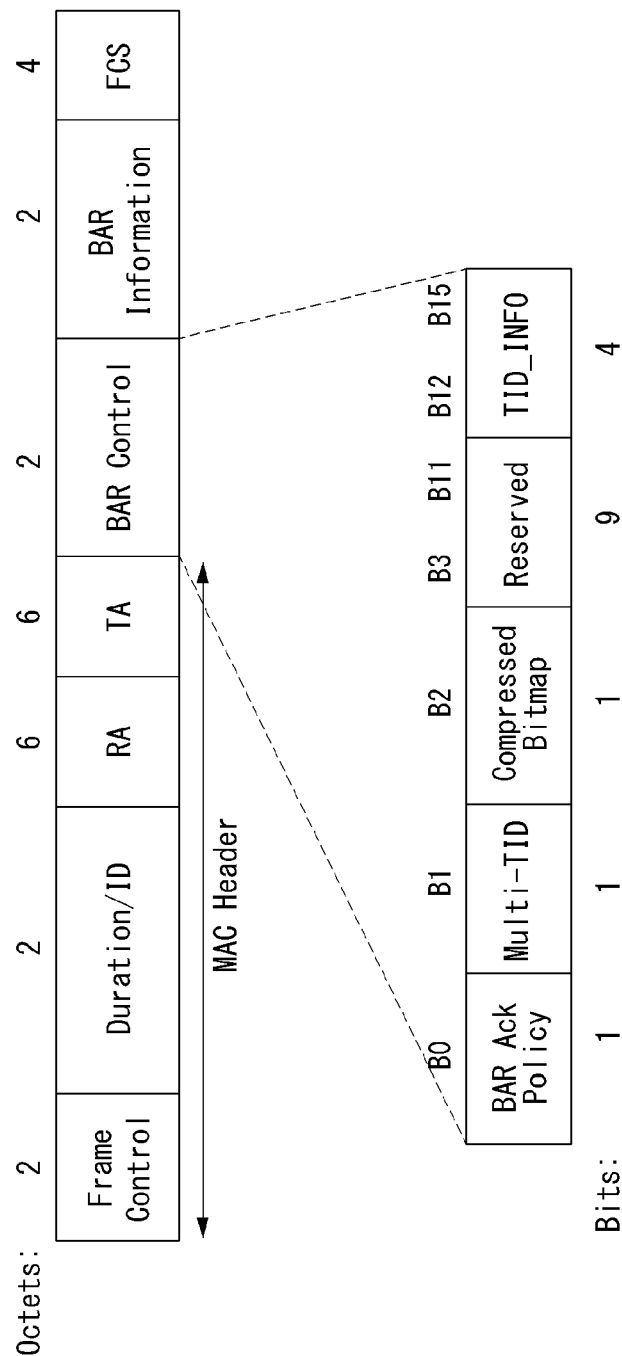
[FIG. 16]

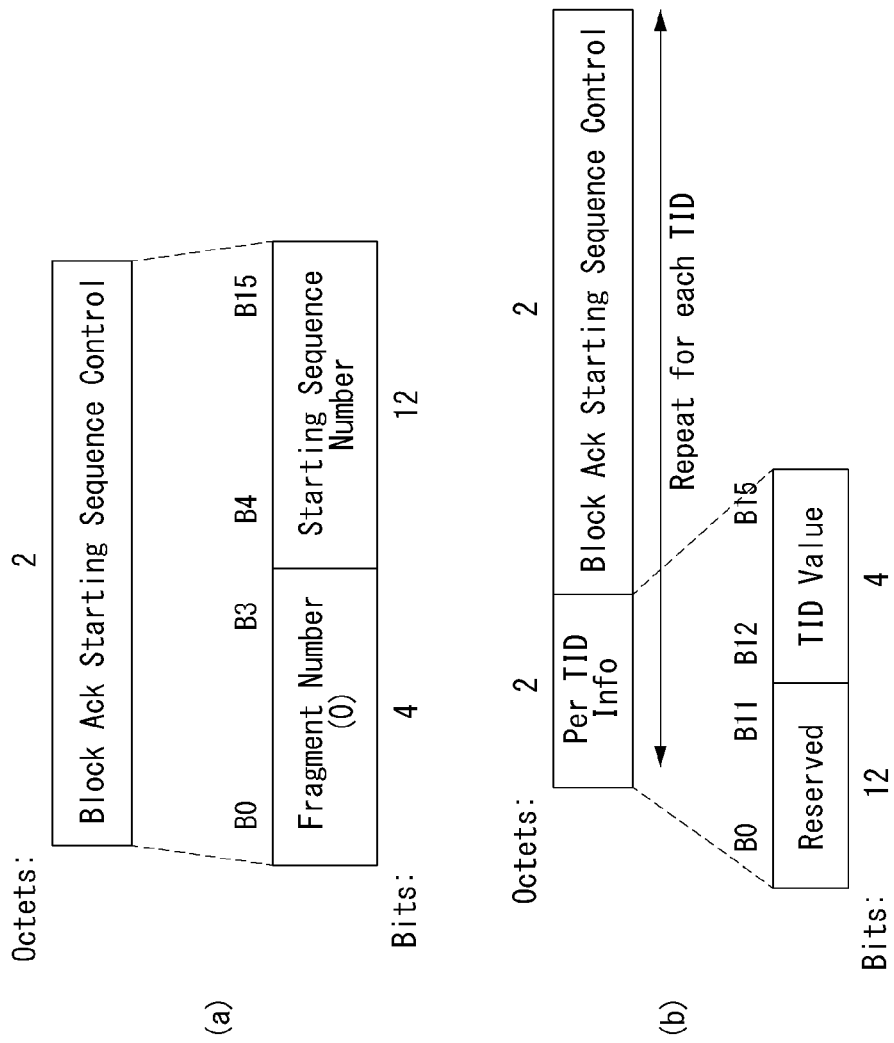

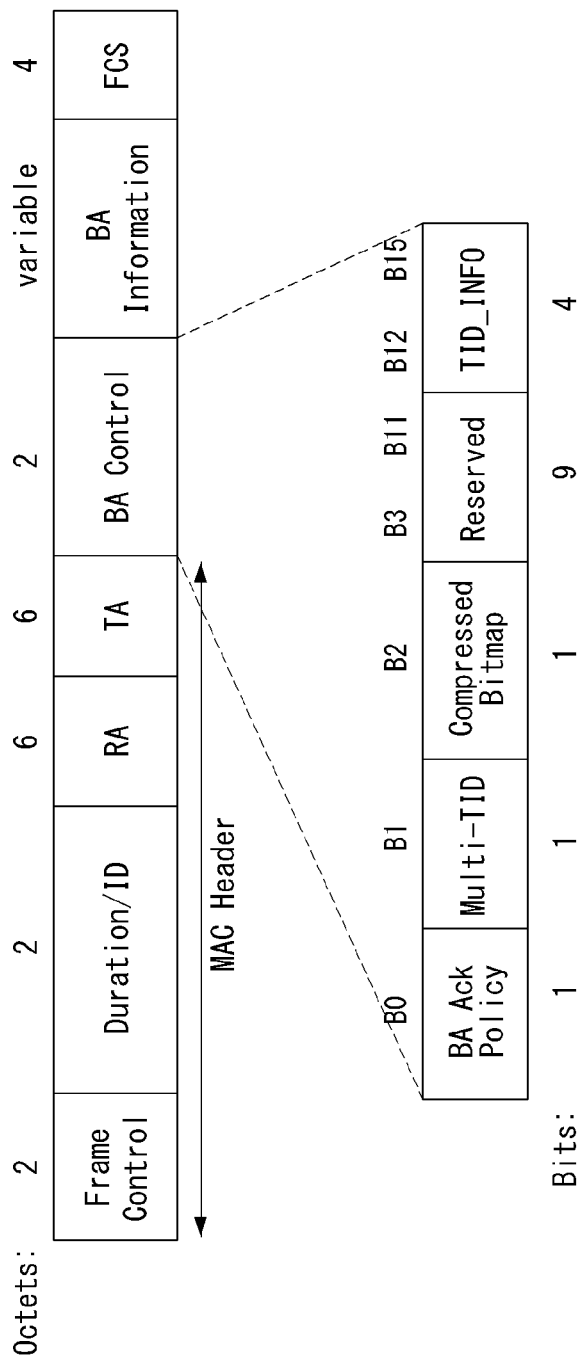

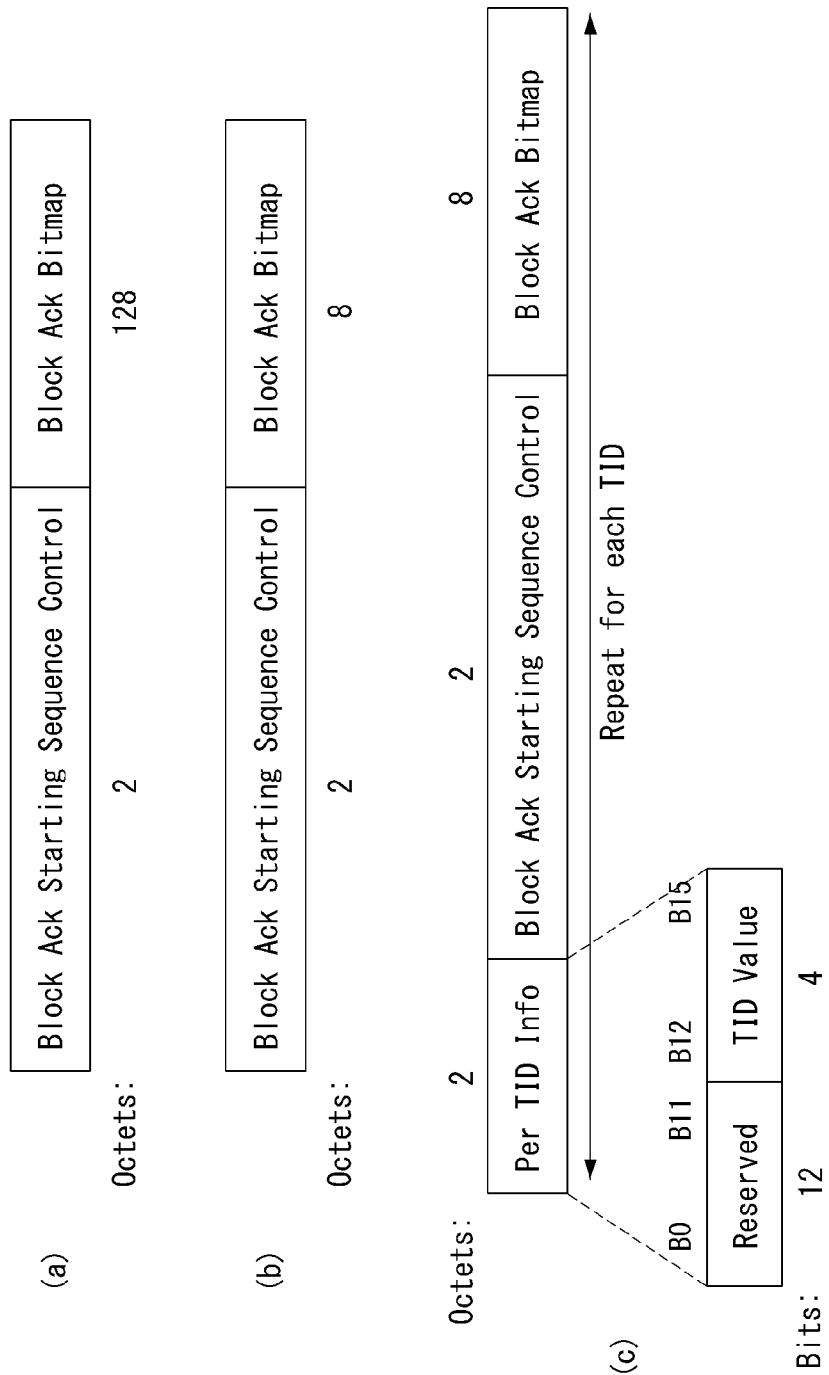
[FIG. 19]

[FIG. 20]
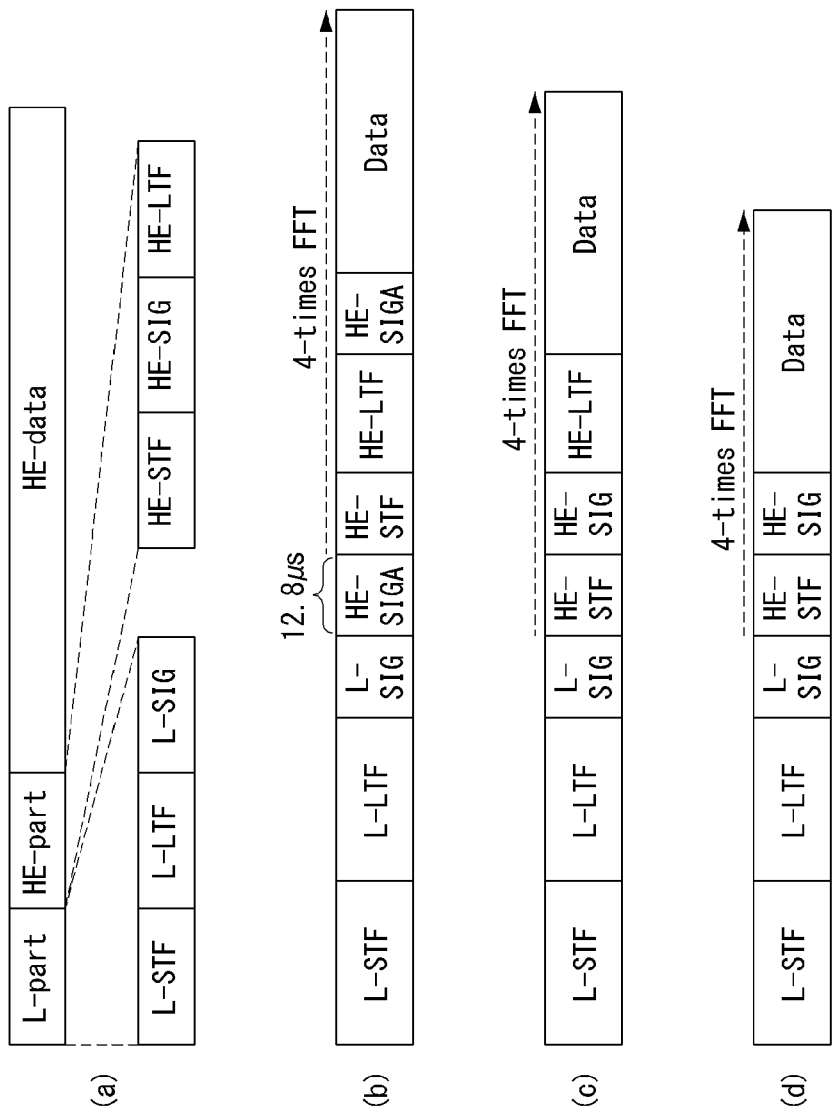
[FIG. 21]
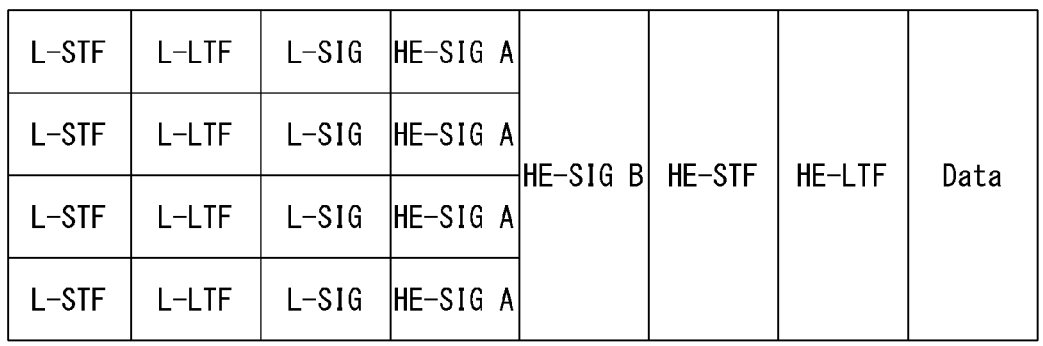

【FIG. 22】

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

【FIG. 23】

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

【FIG. 24】

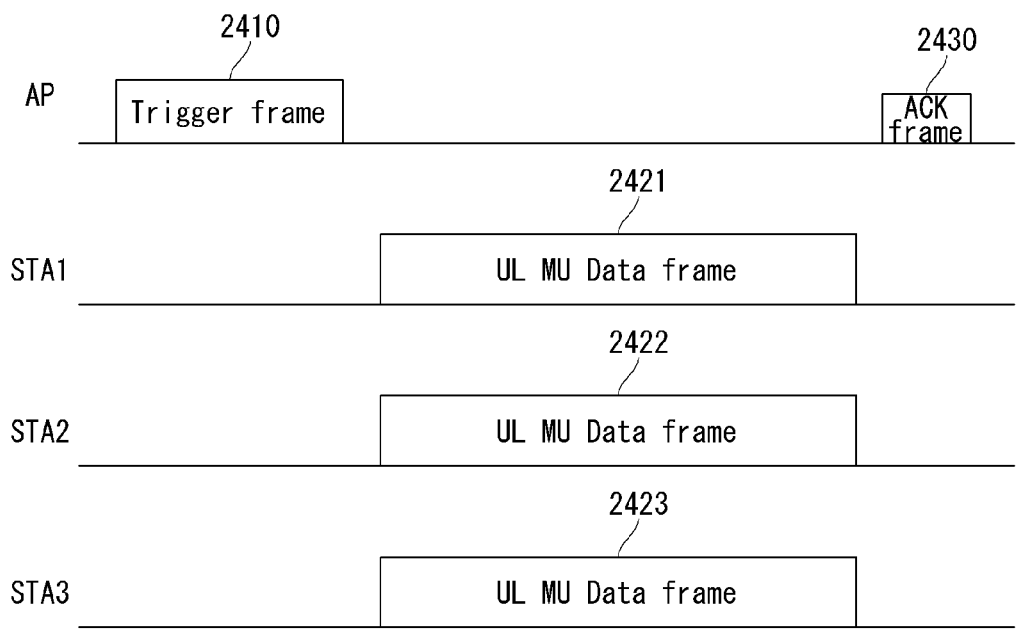

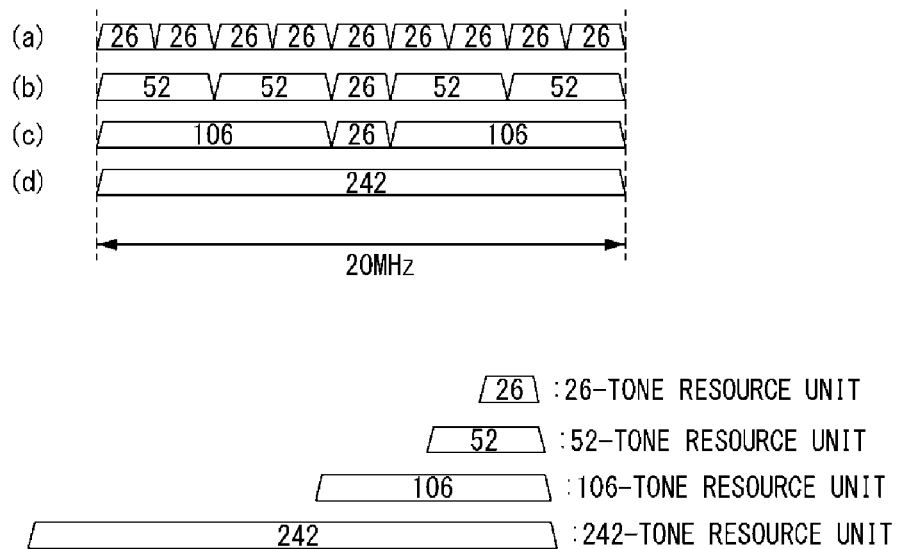
[FIG. 25]

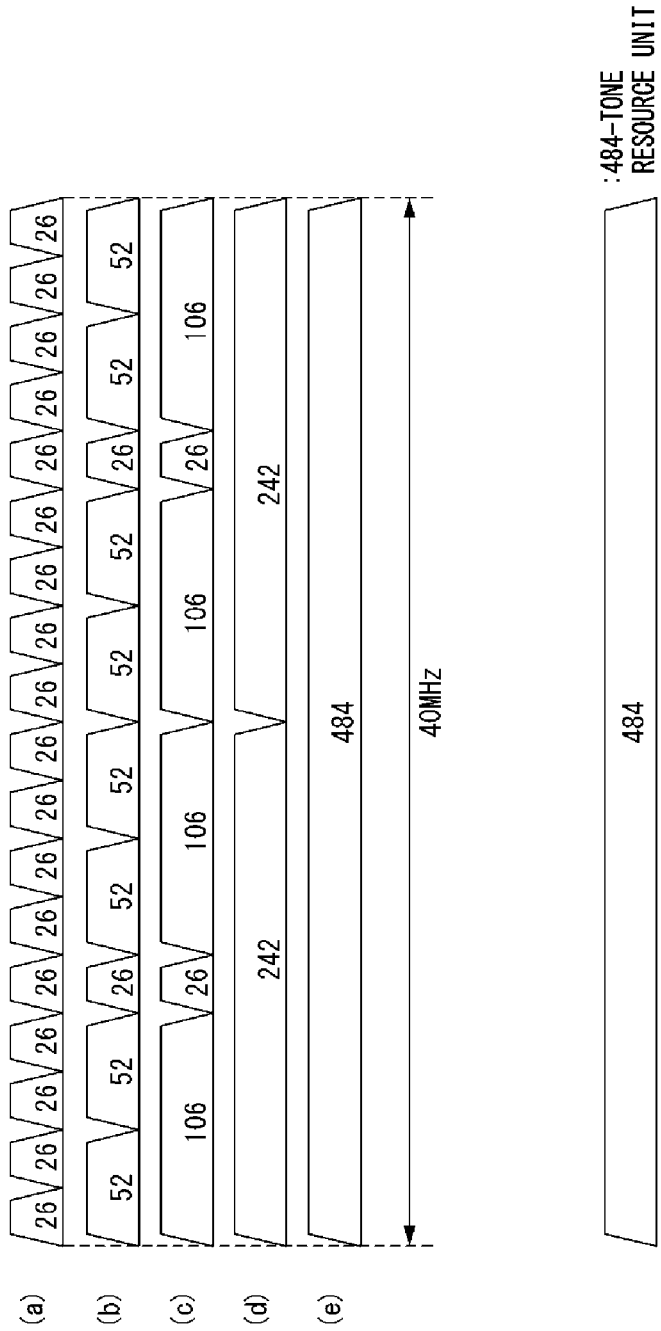
[FIG. 26]

[FIG. 27]
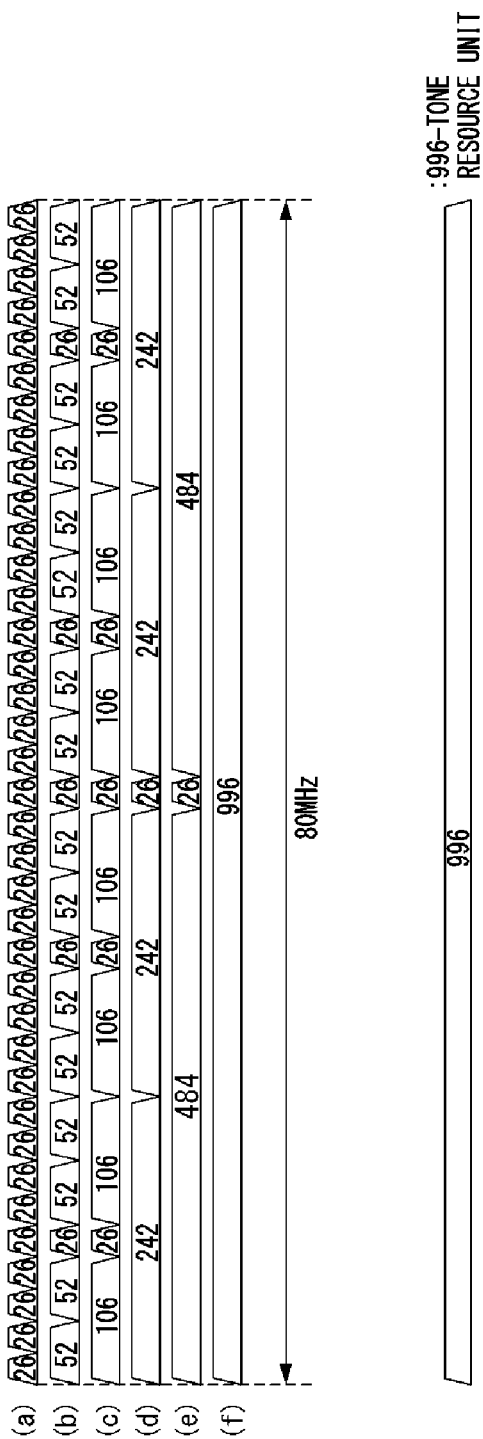

| Nc Index | Nr Index | MIMO Control Channel Width | Grouping (Ng) | Coefficient Size | Codebook Information | Remaining Matrix Segment | Reserved | Sounding Timestamp |
|---|---|---|---|---|---|---|---|---|
| 2 | 2 | 1 | 2 | 2 | 2 | 3 | 2 | 32 |

Bits: B0 B1 B2 B3 B4 B5 B6 B7 B8 B9 B10 B11 B13 B14 B15 B16 B48

(b)

| Antenna Selection Indices |
|---|
| 1 |

Octets:

[FIG. 29]
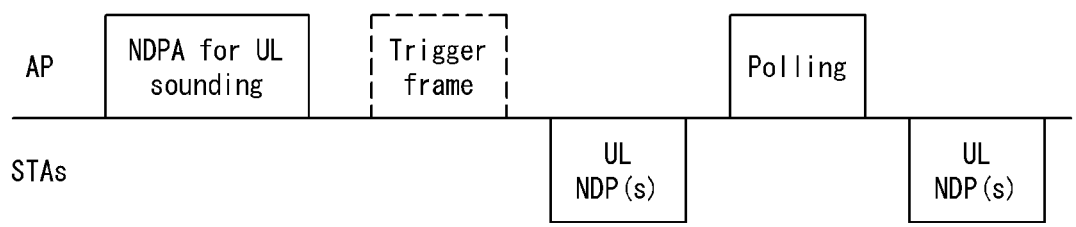
[FIG. 30]
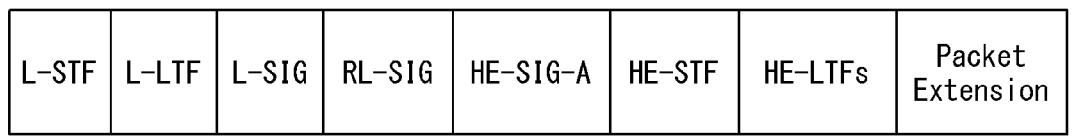
[FIG. 31]
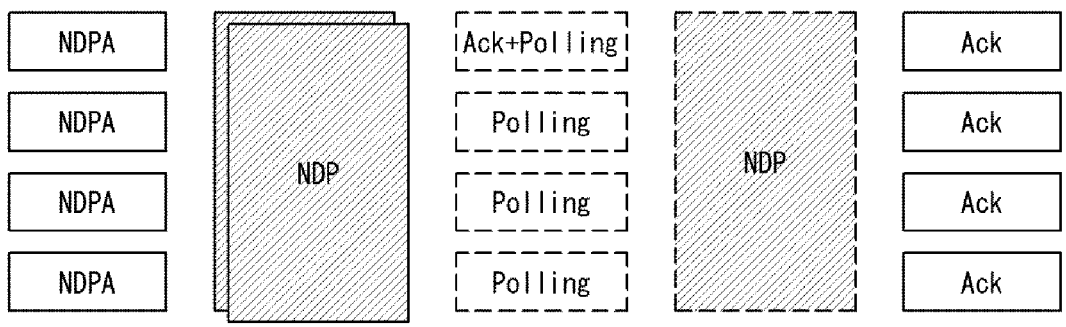

[FIG. 32]
(a)
(b)
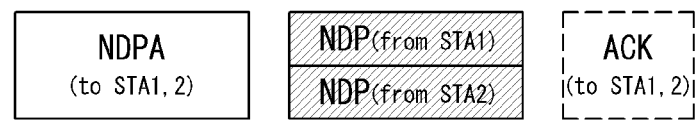
or
(c)
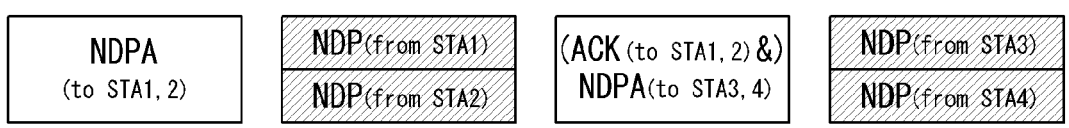

[FIG. 33]
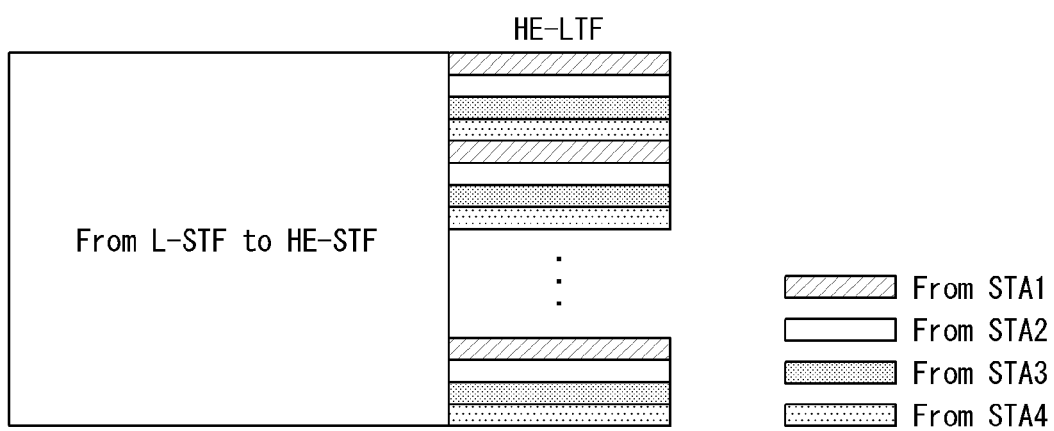

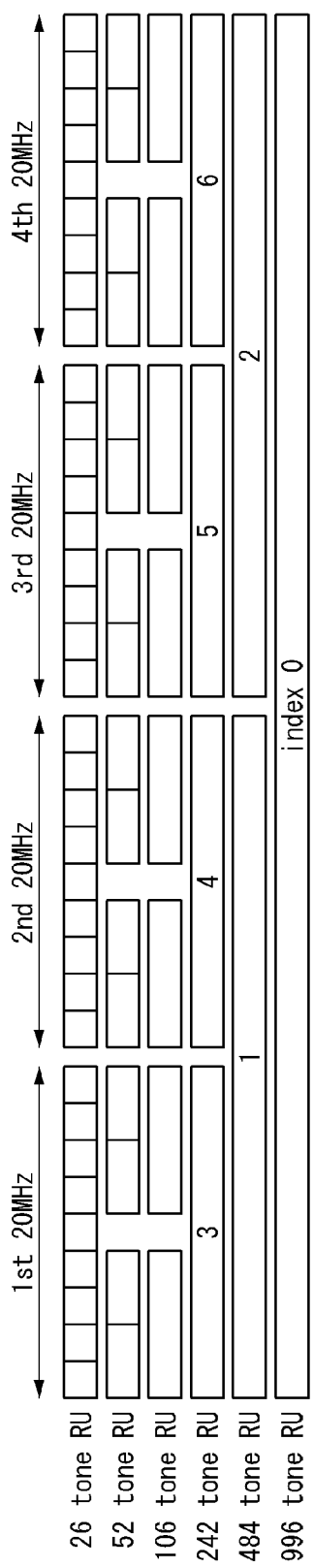
[FIG. 34]

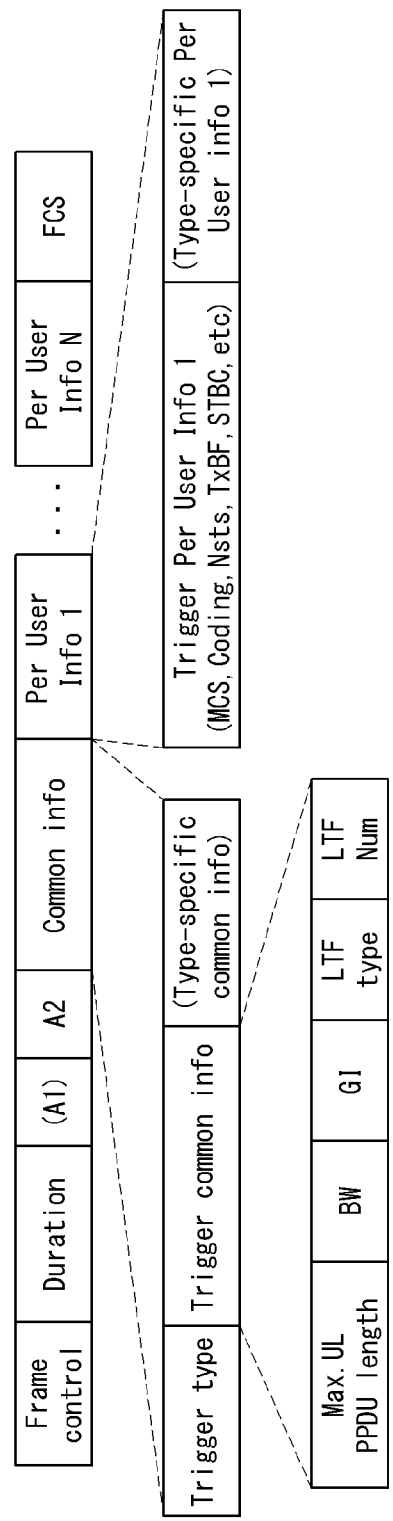
[FIG. 35]

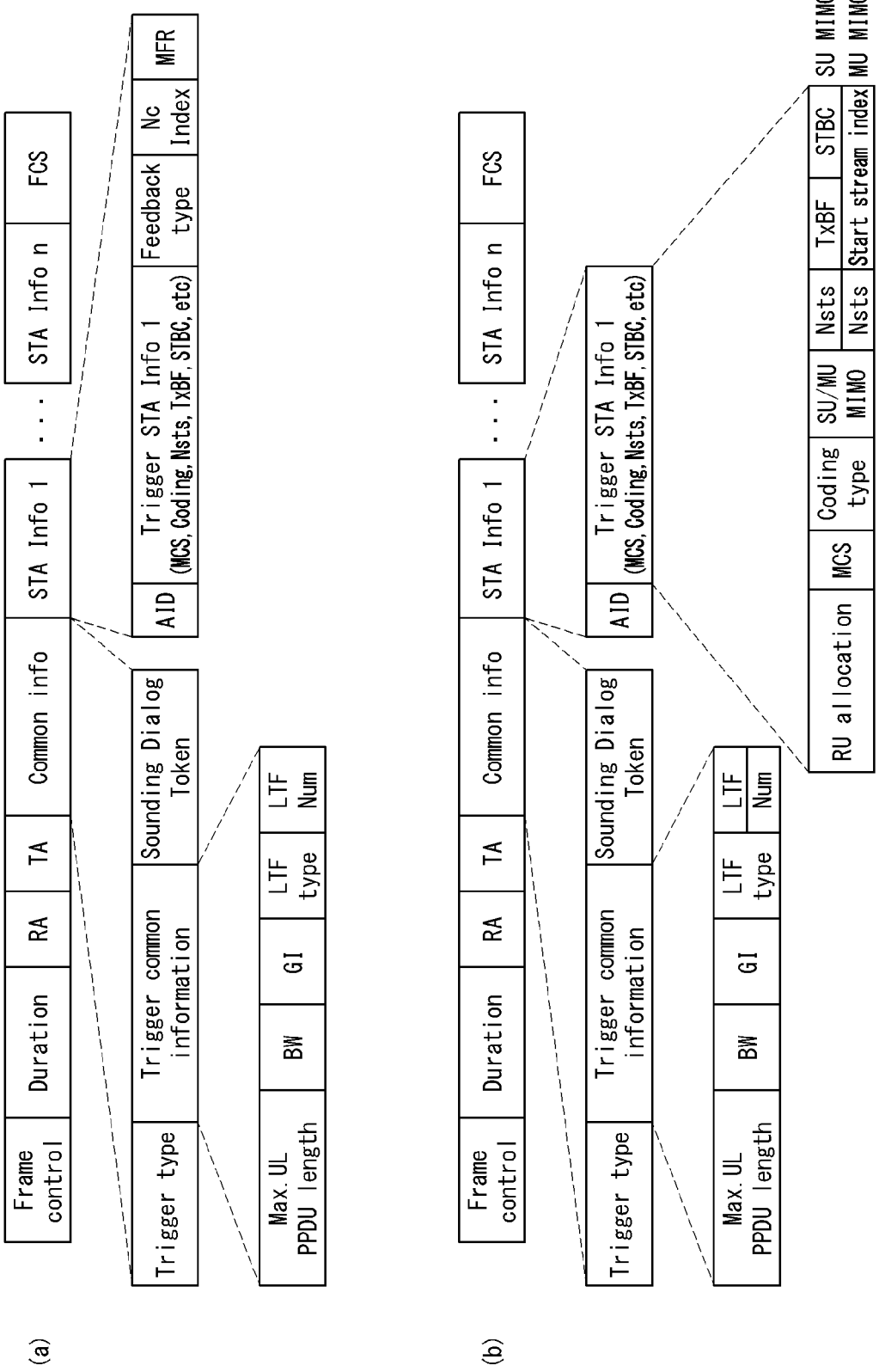
[FIG. 36]

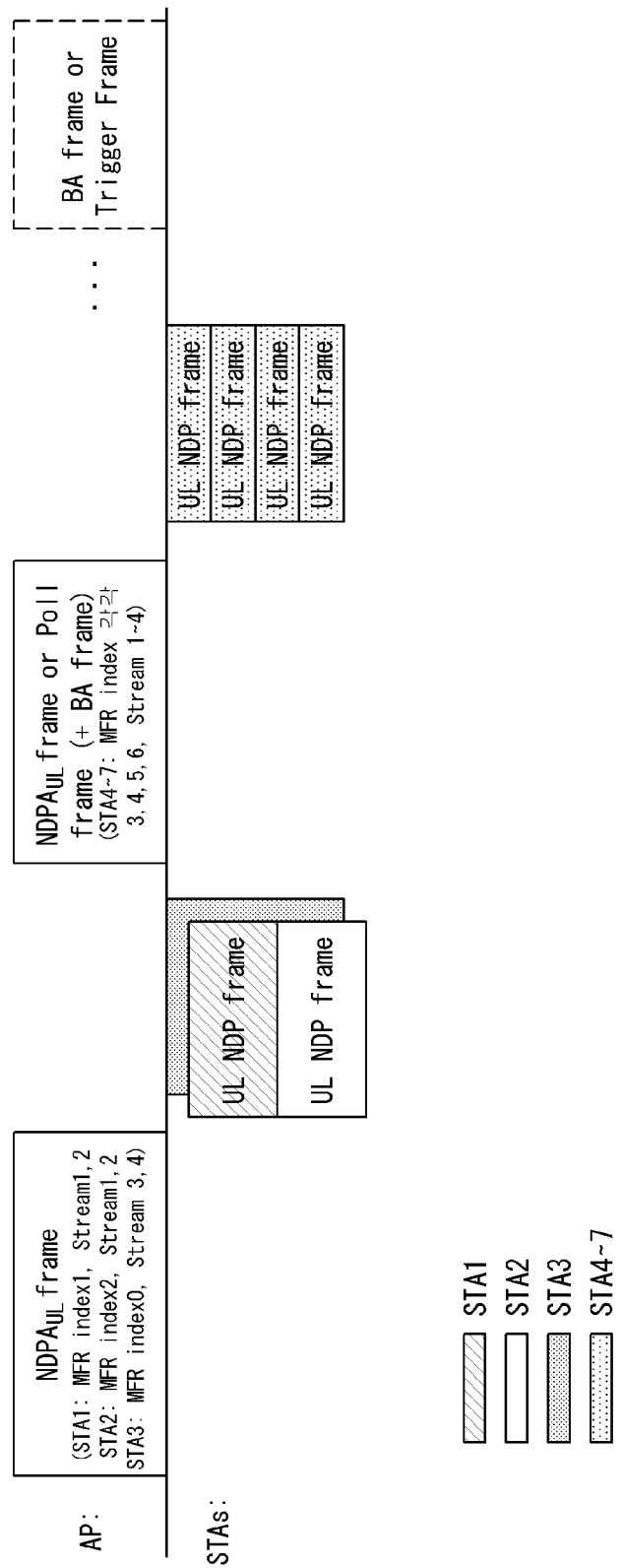

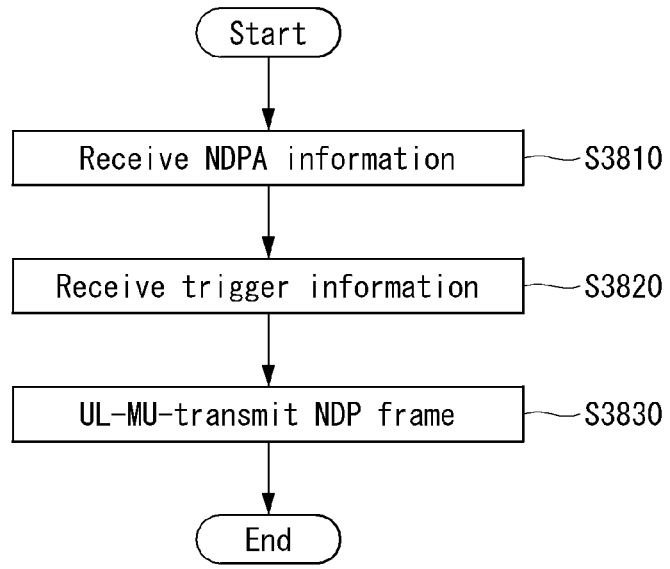
[FIG. 38]
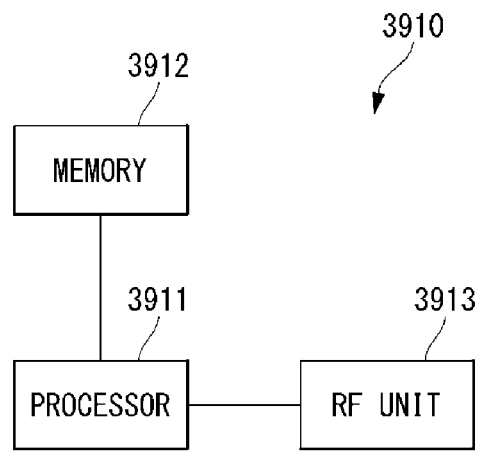
[FIG. 39]

CHANNEL SOUNDING METHOD IN WIRELESS COMMUNICATION SYSTEM AND DEVICE FOR SAME

CROSS-REFERENCE TO RELATED APPLICATIONS

This application is a 35 USC § 371 National Stage entry of International Application No. PCT/KR2016/003965, filed on Apr. 15, 2016, and claims priority to U.S. Provisional Application No. 62/148,184, filed Apr. 16, 2015, U.S. Provisional Application No. 62/209,899, filed Aug. 26, 2015, U.S. Provisional Application No. 62/266,721, filed Dec. 14, 2015 and all of which are incorporated by reference in their entirety herein.

TECHNICAL FIELD

The present invention relates to a wireless communication system and, more particularly, to an uplink channel sounding method for uplink-multi-user-transmitting a channel state measured by a STA and a device supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An object of the present invention is to propose a new sounding protocol applicable to a next-generation wireless communication system and to propose a high efficiency (HE) format of frames transmitted and received for the sounding protocol.

Furthermore, an object of the present invention is to propose an efficient method for STAs to support the UL sounding procedure of an AP in a next-generation wireless communication system.

Furthermore, an object of the present invention is to propose a preliminary procedure for obtaining channel state information for uplink multi-user transmission in a wireless communication system.

The technical objects of the present invention are not limited to those objects described above; other technical objects not mentioned above may be clearly understood from what are described below by those skilled in the art to which the present invention belongs.

Technical Solution

In order to accomplish the technical objects, a method for supporting UL sounding of a station (STA) for measuring an uplink (UL) channel state in a wireless LAN (WLAN) system includes the steps of receiving NDP announcement (NDPA) information indicating an UL transmission of a null data packet (NDP) frame; receiving trigger information indicating an UL MU transmission resource of the NDP frame; and UL multi-user (MU)-transmitting the NDP frame using the UL MU transmission resource indicated by the trigger information, wherein the trigger information may include at least one of spatial resource information or frequency resource information to be used for the UL MU transmission of the NDP frame.

Furthermore, the spatial resource information may indicate the index of at least one spatial stream to be used for the UL transmission of the NDP frame.

Furthermore, the frequency resource information may indicate the index of at least one measuring frequency resource unit to be used for the UL transmission of the NDP frame.

Furthermore, the NDPA information may be received through an NDPA frame, and the trigger information may be received through a trigger frame.

Furthermore, the NDPA frame may include sounding dialog token information and association identifier (AID) information of STAs which are to transmit the NDP frame.

Furthermore, the trigger frame may include at least one of association identifier (AID) information of the STAs which are to transmit the NDP frame, the frequency resource information of the NDP frame and the spatial resource information of the NDP frame.

Furthermore, when the NDP frame is included in an UL physical protocol data unit (PPDU) and transmitted, the trigger frame may further include feedback type information indicating whether the NDP frame is transmitted in a full band of the UL PPDU or the NDP frame is transmitted in a partial band of the UL PPDU.

Furthermore, the NDPA information and the trigger information may be received through a single NDPA frame.

Furthermore, the NDPA frame may include a sounding dialog token field and a STA info field.

Furthermore, the sounding dialog token field may include an indicator indicating that the NDPA frame is a frame indicating the UL transmission of the NDP frame.

Furthermore, the STA info field may include an AID field including association identifier (AID) information of STAs which are to transmit the NDP frame and a feedback type field indicating whether the NDP frame is UL-MU transmitted or not.

Furthermore, when the feedback type field indicates the UL MU transmission of the NDP frame, the STA info field may further include a measuring frequency resource unit field indicative of the frequency resource information of the NDP frame and an Nc index field indicative of the spatial resource information of the NDP frame.

Furthermore, the NDPA information and the trigger information may be received through a single trigger frame.

Furthermore, the trigger frame may include a common information field including common information about STAs receiving the trigger frame and a user-specific field including individual information about each STA receiving the trigger frame.

Furthermore, the common information field may include sounding dialog token information.

Furthermore, the user-specific field may include at least one of association identifier (AID) information of STAs which are to transmit the NDP frame, feedback type information indicating whether the NDP frame is UL-multi-user (MU)-transmitted or not, the frequency resource information of the NDP frame, and the spatial resource information of the NDP frame.

Furthermore, the NDP frame may include a legacy-short training field (L-STF), a legacy-long training field (L-LTF), a legacy signal (L-SIG) field, a repeated L-SIG (RL-SIG) field, a high efficiency signal (HE-SIG) A field, a high efficiency STF (HE-STF) and a high efficiency LTF (HE-LTF).

Furthermore, a station (STA) device in a wireless LAN (WLAN) system according to another embodiment of the present invention includes an RF unit configured to transceive a radio signal and a processor configured to control the RF unit, wherein the processor is further configured to receive NDP announcement (NDPA) information indicating an UL transmission of a null data packet (NDP) frame, receive trigger information indicating an UL MU transmission resource of the NDP frame, and UL multi-user (MU)-transmit the NDP frame using the UL MU transmission resource indicated by the trigger information, wherein the trigger information may include at least one of spatial resource information or frequency resource information to be used for the UL MU transmission of the NDP frame.

Advantageous Effects

In accordance with an embodiment of the present invention, an NDP frame can be UL-multi-user-transmitted through each of different spatial streams or frequency resources in a wireless communication system.

Furthermore, in accordance with an embodiment of the present invention, uplink multi-user transmission can be smoothly performed based on channel state information for uplink multi-user transmission in a wireless communication system.

Furthermore, in accordance with an embodiment of the present invention, an uplink channel sounding protocol can be smoothly performed based on a frame structure for uplink channel sounding in a wireless communication system.

In addition, other effects of the present invention are additionally described in the following embodiments.

DESCRIPTION OF DRAWINGS

The accompanying drawings included as part of the detailed description in order to help understanding regarding the present invention provide embodiments of the present invention and describe the technical characteristics of the present invention along with the detailed description.

FIG. 1 is a diagram showing an example of an IEEE 802.11 system to which the present invention may be applied.

FIG. 2 is a diagram illustrating the structure of layer architecture of an IEEE 802.11 system to which the present invention may be applied.

FIG. 3 illustrates a non-HT format PPDU and an HT format PPDU in a wireless communication system to which the present invention may be applied.

FIG. 4 illustrates a VHT format PPDU in a wireless communication system to which the present invention may be applied.

FIG. 5 illustrates the MAC frame format of the IEEE 802.11 system to which the present invention may be applied.

FIG. 6 is a diagram illustrating a frame control field within a MAC frame in a wireless communication system to which the present invention may be applied.

FIG. 7 is a diagram conceptually showing a method of channel sounding in a wireless communication system to which the present invention may be applied.

FIG. 8 is a diagram illustrating a VHT NDPA frame in a wireless communication system to which the present invention may be applied.

FIG. 9 is a diagram illustrating an NDP PPDU in a wireless communication system to which the present invention may be applied.

FIG. 10 is a diagram illustrating a VHT compressed beamforming frame format in a wireless communication system to which the present invention may be applied.

FIG. 11 is a diagram illustrating a Beamforming Report Poll frame format in a wireless communication system to which the present invention may be applied.

FIG. 12 is a diagram illustrating a downlink multi-user PPDU format in a wireless communication system to which the present invention may be applied.

FIG. 13 is a diagram illustrating a downlink multi-user PPDU format in a wireless communication system to which the present invention may be applied.

FIG. 14 is a diagram illustrating a downlink MU-MIMO transmission process in a wireless communication system to which the present invention may be applied.

FIG. 15 is a diagram illustrating an ACK frame in a wireless communication system to which the present invention may be applied.

FIG. 16 is a diagram illustrating a Block Ack Request frame in a wireless communication system to which the present invention may be applied.

FIG. 17 is a diagram illustrating the BAR Information field of a Block Ack Request frame in a wireless communication system to which the present invention may be applied.

FIG. 18 is a diagram illustrating a Block Ack frame in a wireless communication system to which the present invention may be applied.

FIG. 19 is a diagram illustrating the BA Information field of a Block Ack frame in a wireless communication system to which the present invention may be applied.

FIG. 20 is a diagram illustrating a high efficiency (HE) format PPDU according to an embodiment of the present invention.

FIGS. 21 to 23 are diagrams illustrating a HE format PPDU according to an embodiment of the present invention.

FIG. 24 is a diagram illustrating an uplink multi-user transmission procedure according to an embodiment of the present invention.

FIGS. 25 to 27 are diagrams illustrating a resource allocation unit in an OFDMA multi-user transmission method according to an embodiment of the present invention.

FIGS. 28(a) and 28(b) are diagrams illustrating a MIMO control field and an antenna selection indices field in the 802.11n system.

FIG. 29 is a diagram illustrating an UL sounding protocol according to an embodiment of the present invention.

FIG. 30 is a diagram illustrating the HE format of an NDP frame transmitted and received in the UL sounding protocol according to an embodiment of the present invention.

FIG. 31 is a diagram illustrating frames transmitted and received in the UL sounding protocol according to an embodiment of the present invention.

FIG. 32 is a diagram illustrating various embodiments regarding the UL SU/MU transmission method of an NDP frame according to embodiments of the present invention.

FIG. 33 is a diagram illustrating the UL MU transmission method of an HE-LTF within an NDP frame according to an embodiment of the present invention.

FIG. 34 is a diagram illustrating a measuring frequency resource (MFR) according to an embodiment of the present invention.

FIG. 35 is a diagram illustrating the HE format of a trigger frame.

FIG. 36 is a diagram illustrating the HE format of a trigger frame according to an embodiment of the present invention.

FIG. 37 is a diagram illustrating an UL sounding protocol according to an embodiment of the present invention.

FIG. 38 is a flowchart illustrating the UL sounding support method of a STA device according to an embodiment of the present invention.

FIG. 39 is a block diagram of each STA device according to an embodiment of the present invention.

BEST MODE

Terms used in this specification are common terms now widely used by taking into consideration functions in this specification, but the terms may be changed depending on intentions or use practices of those skilled in the art or the appearance of a new technology. Furthermore, in a specific case, some terms are randomly selected by the applicant. In this case, the meaning of a corresponding term will be described in the corresponding part of the description of this specification. Accordingly, the terms used in this specification should not be understood simply based on their names, but should be understood based on their substantial meanings and contents throughout this specification, Furthermore, the embodiments are described in detail with reference to the accompanying drawings and contents described in the accompanying drawings, but the present invention is not restricted by the embodiments.

Hereinafter, the preferred embodiments of the present invention are described in detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the structure of a layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLOP) entity and a physical medium dependent (PMD) entity. In this case, the PLOP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer.

The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of 4 bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF field may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF field may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

The fields up to HT-SIG field are transmitted without performing beamforming so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| Field | Bit | Description |
| --- | --- | --- |
| MCS (Modulation and coding scheme) | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| Field | Bit | Description |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4 |

TABLE 2-continued

| Field | Bit | Description |
|---|---|---|
| | | In the case of a VHT SU PPDU, |
| | | Upper 3 bits are set as follows: |
| | | "0" if a space-time stream is 1 |
| | | "1" if a space-time stream is 2 |
| | | "2" if a space-time stream is 3 |
| | | "3" if a space-time stream is 4 |
| | | "4" if a space-time stream is 5 |
| | | "5" if a space-time stream is 6 |
| | | "6" if a space-time stream is 7 |
| | | "7" if a space-time stream is 8 |
| | | Lower 9 bits indicate a partial AID. |
| TXOP_PS_NOT_ALLOWED | 1 | Set to "0" if a VHT AP permits a non-AP VHT STA to switch to power save mode during transmission opportunity (TXOP) Set to "1" if not In the case of a VHT PPDU transmitted by a non-AP VHT STA Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

TABLE 3

| Field | Bit | Description |
|---|---|---|
| Short GI | 1 | Set to "0" if a short GI is not used in a data field Set to "1" if a short GI is used in a data field |
| Short GI disambiguation | 1 | Set to "1" if a short GI is used and an extra symbol is required for the payload of a PPDU Set to "0" if an extra symbol is not required |
| SU/MU coding | 1 | In the case of a VHT SU PPDU: Set to "0" in the case of binary convolutional code (BCC) Set to "1" in the case of low-density parity check (LDPC) In the case of a VHT MU PPDU: Indicate coding used if the NSTS field of a user whose user position is "0" is not "0" Set to "0" in the case of BCC Set to "1" in the case of PDPC Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU) Set to "0" if not |
| SU VHT MCS/MU coding | 4 | In the case of a VHT SU PPDU: Indicate a VHT-MCS index In the case of a VHT MU PPDU: Indicate coding for user positions "1" to "3" sequentially from upper bits Indicate coding used if the NSTS field of each user is not "1" Set to "0" in the case of BCC Set to "1" in the case of LDPC Set to "1" as a reserved field if the NSTS field of each user is "0" |
| Beamformed | 1 | In the case of a VHT SU PPDU: Set to "1" if a beamforming steering matrix is applied to SU transmission Set to "0" if not In the case of a VHT MU PPDU: Set to "1" as a reserved field |
| Reserved | 1 | |
| CRC | 8 | Include CRS for detecting an error of a PPDU on the receiver side |
| Tail | 6 | Used to terminate the trellis of a convolutional decoder Set to "0" |

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

MAC Frame Format

FIG. 5 illustrates a MAC frame format in an IEEE 802.11 system to which the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating the frame control field in the MAC frame in a wireless communication system to which the present invention may be applied.

Referring to FIG. 6, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames, Control frames, and Data frames.

Each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. Also, the above-described fields are examples of the fields that may be included in the MAC frame but not limited to them. That is, the above-described fields may be substituted with other fields or further include additional fields, and not all of the fields may be necessarily included.

Channel State Information Feedback Method

SU-MIMO technology, in which a beamformer assigns all antennas to one beamformee for communication, enhances channel capacity through spatial-temporal diversity gain and multi-stream transmission. SU-MIMO technology uses more antennas than when MIMO technology is not used, thereby leveraging spatial degrees of freedom and contributing to the improvement of a physical layer.

MU-MIMO technology, in which a beamformer assigns antennas to multiple beamformees, can improve the performance of MIMO antennas by increasing the per-beamformee transfer rate or channel reliability through a link layer protocol for multiple access of multiple beamformees connected to the beamformer.

In MIMO environments, performance depends largely on how accurate channel information the beamformer acquires. Thus, a feedback procedure is required to acquire channel information.

There are largely two types of feedback supported to acquire channel information: one is to use a control frame and the other is to use a channel sounding procedure which does not include a data field. Sounding refers to using a preamble training field to measure channel for other purposes than data demodulation of a PPDU including the corresponding training field.

Hereinafter, a channel information feedback method using a control frame and a channel information feedback method using an NDP (null data packet) will be described in more detail.

1) Feedback Method Using Control Frame

In MIMO environments, a beamformer may instruct a beamformee to send channel state information feedback through the HT control field included in the MAC header, or the beamformee may report channel state information through the HT control field included in the MAC header (see FIG. 8). The HT control field may be included in a Control Wrapper frame, a QoS Data frame in which the Order subfield of the MAC header is set to 1, and a Management frame.

2) Feedback Method Using Channel Sounding

FIG. 7 is a diagram conceptually showing a method of channel sounding in a wireless communication system to which the present invention may be applied.

FIG. 7 illustrates a method of feedback of channel state information between a beamformer (e.g., AP) and a beamformee (e.g., non-AP STA) based on a sounding protocol. The sounding protocol may refer to a procedure of receiving feedback about information on channel state information.

A method of sounding channel state information between a beamformer and a beamformee based on a sounding protocol may be performed in the following steps:

(1) A beamformer transmits a VHT NDPA (VHT Null Data Packet Announcement) frame indicating sounding and transmission for feedback from a beamformee.

The VHT NDPA frame refers to a control frame that is used to indicate that channel sounding is initiated and an NDP (Null Data Packet) is transmitted. In other words, a VHT NDPA frame may be transmitted before NDP transmission to allow a beamformee to ready to feed back channel state information before receiving the NDP frame.

The VHT NDPA frame may contain AID (association identifier) information, feedback type information, etc. of a beamformee that will transmit an NDP. A more detailed description of the VHT NDPA frame will be given later.

The VHT NDPA frame may be transmitted in different ways for MU-MIMO-based data transmission and SU-MIMO-based data transmission. For example, in the case of channel sounding for MU-MIMO, the VHT NDPA frame may be transmitted in a broadcast manner, whereas, in the case of channel sounding for SU-MIMO, the VHT NDPA frame may be transmitted in a unicast manner.

(2) After transmitting the VHT NDPA frame, the beamformer transmits an NDP after an SIFS. The NDP has a VHT PPDU structure but without a data field.

Beamformees that have received the VHT NDPA frame may check the value of the AID12 subfield included in the STA information field and determine whether they are a target STA for sounding.

Moreover, the beamformees may know their order of feedback through the STA Info field included in the NDPA. FIG. 11 illustrates that feedback occurs in the order of Beamformee 1, Beamformee 2, and Beamformee 3.

(3) The beamformee 1 acquires downlink channel state information based on the training field included in the NDP and generates feedback information to send to the beamformer.

the beamformee 1 transmits a VHT compressed beamforming frame containing feedback information to the beamformer after an SIFS after receiving the NDP frame.

The VHT compressed beamforming frame may include an SNR value for a space-time stream, information on a compressed beamforming feedback matrix for a subcarrier, and so on. A more detailed description of the VHT compressed beamforming frame will be provided later.

(4) The beamformer receives the VHT compressed beamforming frame from Beamformee 1, and then, after an SIFS, transmits a Beamforming Report Poll frame to Beamformee 2 in order to acquire channel information from Beamformee 2.

The Beamforming Report Poll frame is a frame that performs the same role as the NDP frame. Beamformee 2 may measure channel state based on the transmitted Beamforming Report Poll frame.

A more detailed description of the Beamforming Report Poll frame will be given later.

(5) After receiving the Beamforming Report Poll frame, Beamformee 2 transmits a VHT Compressed Beamforming frame containing feedback information to the beamformer after an SIFS.

(6) The beamformer receives the VHT Compressed Beamforming frame from Beamformee 2 and then, after an SIFS, transmits a Beamforming Report Poll frame to Beamformee 3 in order to acquire channel information from Beamformee 3.

(7) After receiving the Beamforming Report Poll frame, Beamformee 3 transmits a VHT Compressed Beamforming frame containing feedback information to the beamformer after an SIFS.

Hereinafter, a frame used for the above-described channel sounding procedure will be discussed.

FIG. 8 is a diagram illustrating a VHT NDPA frame in a wireless communication system to which the present invention may be applied.

Referring to FIG. 8, a VHT NDPA frame may consist of a Frame Control field, a Duration field, an RA (Receiving Address) field, a TA (Transmitting Address) field, a Sounding Dialog Token field, an STA Info 1 field through STA info n field, and an FCS.

The RA field value indicates the address of a receiver or STA which receives the VHT NDPA frame.

If the VHT NDPA frame includes only one STA Info field, then the RA field is set to the address of the STA identified by the AID in the STA Info field. For example, when transmitting the VHT NDPA frame to one target STA for SU-MIMO channel sounding, an AP unicasts the VHT NDPA frame to the target STA.

On the other hand, if the VHT NDPA frame includes more than one STA Info field, then the RA field is set to the broadcast address. For example, when transmitting the VHT NDPA frame to at least one target STA for MU-MIMO channel sounding, an AP broadcasts the VHT NDPA frame.

The TA field value indicates the address of a transmitter or transmitting STA which transmits the VHT NDPA frame or a bandwidth signaling TA.

The Sounding Dialog Token field also may be called a Sounding Sequence field. The Sounding Dialog Token Number subfield in the Sounding Dialog Token field contains a value selected by the beamformer to identify the VHT NDPA frame.

The VHT NDPA frame includes at least one STA Info field. That is, the VHT NDPA frame includes an STA Info field containing information on target STAs for sounding. One STA Info field may be included for each target STA for sounding.

Each STA Info field may include an AID12 subfield, a Feedback Type subfield, and an NC Index subfield.

Table 4 shows the subfields of an STA Info field included in the VHT NDPA frame.

TABLE 4

| Subfield | Description |
| --- | --- |
| AID12 | Contains the AID of a target STA for sounding feedback. The AID12 subfield value is set to '0' if the target STA is an AP, mesh STA, or STA that is a member of an IBSS. |
| Feedback Type | Indicates the type of feedback requested for the target STA for sounding. Set to 0 for SU-MIMO. Set to 1 for MU-MIMO. |
| Nc Index | If the Feedback Type subfield indicates MU-MIMO, then NcIndex indicates the number of columns, Nc, in the Compressed Beamforming Feedback Matrix subfield minus 1. Set to 0 for Nc = 1, Set to 1 for Nc = 2, ... Set to 7 for Nc = 8. Reserved if the Feedback Type subfield indicates SU-MIMO. |

Information contained in the above-described fields may be as defined in the IEEE 802.11 system. Also, the above-described fields are examples of the fields that may be included in the MAC frame but not limited to them. That is, the above-described fields may be substituted with other fields or further include additional fields.

FIG. 9 is a diagram illustrating an NDP PPDU in a wireless communication system to which the present invention may be applied.

Referring to FIG. 9, an NDP may have the VHT PPDU format shown previously in FIG. 4, but without the data field. The NDP may be precoded based on a particular precoding matrix and transmitted to a target STA for sounding.

In the L-SIG field of the NDP, the length field indicating the length of a PSDU included in the data field is set to '0'.

In the VHT-SIG-A field of the NDP, the Group ID field indicating whether a transmission technique used for NDP transmission is MU-MIMO or SU-MIMO is set to a value indicating SU-MIMO transmission.

The data bits of the VHT-SIG-B field of the NDP are set to a fixed bit pattern for each bandwidth.

Upon receiving the NDP, the target STA for sounding performs channel estimation and acquires channel state information.

FIG. 10 is a diagram illustrating a VHT compressed beamforming frame format in a wireless communication system to which the present invention may be applied.

Referring to FIG. 10, the VHT compressed beamforming frame is a VHT Action frame for supporting VHT functionality, and its frame body includes an Action field. The Action field is included in the frame body of a MAC frame to provide a mechanism for specifying extended management actions.

The Action field consists of a Category field, a VHT Action field, a VHT MIMO Control field, a VHT Compressed Beamforming Report field, and an MU Exclusive Beamforming Report field.

The Category field is set to a value indicating the VHT category (i.e., VHT Action frame), and the VHT Action field is set to a value indicating the VHT Compressed Beamforming frame.

The VHT MIMO Control field is used to feed back control information related to beamforming feedback. The VHT MIMO Control field may always be present in the VHT Compressed Beamforming frame.

The VHT Compressed Beamforming Report field is used to feed back information on a beamforming matrix containing SNR information for space-time streams used for transmitting data.

The MU Exclusive Beamforming Report field is used to feed back SNR information for spatial streams when performing a MU-MIMO transmission.

The presence and content of the VHT Compressed Beamforming Report field and the MU Exclusive Beamforming Report field are dependent on the values of the Feedback Type, Remaining Feedback Segments, and First Feedback Segment subfields of the VHT MIMO Control field Hereinafter, the VHT MIMO Control field, the VHT Compressed Beamforming Report field, and the MU Exclusive Beamforming Report field may be discussed more concretely.

1) The VHT MIMO Control field consists of an Nc index subfield, an Nr Index subfield, a Channel Width subfield, a Grouping subfield, a Codebook Information subfield, a Feedback type subfield, a Remaining Feedback segments subfield, a First Feedback segment subfield, a reserved subfield, and a Sounding Dialog Token Number field.

Table 5 shows the subfields of the VHT MIMO Control field.

TABLE 5

| Subfield | Bits | Description |
| --- | --- | --- |
| Nc Index | 3 | Indicates the number of columns, Nc, in the compressed beamforming feedback matrix minus 1:<br>Set to 0 for Nc = 1,<br>Set to 1 for Nc = 2,<br>. . .<br>Set to 7 for Nc = 8. |
| Nr Index | 3 | Indicates the number of rows, Nr, in the compressed beamforming feedback matrix minus 1:<br>Set to 0 for Nr = 1,<br>Set to 1 for Nr = 2,<br>. . .<br>Set to 7 for Nr = 8. |
| Channel Width | 2 | Indicates the width of the channel measured to create a compressed beamforming feedback matrix:<br>Set to 0 for 20 MHz,<br>Set to 1 for 40 MHz,<br>Set to 2 for 80 MHz,<br>Set to 3 for 160 MHz or 80 + 80 MHz. |
| Grouping | 2 | Indicates the subcarrier grouping, Ng, used for the compressed beamforming feedback matrix:<br>Set to 0 for Ng = 1 (No grouping),<br>Set to 1 for Ng = 2,<br>Set to 2 for Ng = 4,<br>The value 3 is reserved. |
| Codebook Information | 1 | Indicates the size of codebook entries:<br>If Feedback Type is SU:<br>Set to 0 for b$\Psi$ = 2 and b$\Phi$ = 4,<br>Set to 1 for b$\Psi$ = 4 and b$\Phi$ = 6.<br>If Feedback Type is MU:<br>Set to 0 for b$\Psi$ = 5 and b$\Phi$ = 7<br>Set to 1 for b$\Psi$ = 7 and b$\Phi$ = 9.<br>Here, b$\Psi$ and b$\Phi$ indicate the number of quantization bits. |
| Feedback Type | 1 | Indicates the feedback type:<br>Set to 0 for SU-MIMO,<br>Set to 1 for MU-MIMO. |
| Remaining Feedback Segments | 3 | Indicates the number of remaining feedback segments for the associated VHT Compressed Beamforming frame:<br>Set to 0 for the last feedback segment of a segmented report or the only feedback segment of an unsegmented report.<br>Set to a value between 1 and 6 for a feedback segment that is neither the first nor the last of a segmented report.<br>Set to a value between 1 and 6 for a feedback segment that is not the last feedback segment of a segmented report. |

TABLE 5-continued

| Subfield | Bits | Description |
|---|---|---|
| | | In a retransmitted feedback segment, the field is set to the same value as the associated feedback segment in the original transmission. |
| First Feedback Segment | 1 | Set to 1 for the first feedback segment of a segmented report or the only feedback segment of an unsegmented report; Set to 0 if it is not the first feedback segment or if the VHT Compressed Beamforming Report field and MU Exclusive Beamforming Report field are not present in the frame. In a retransmitted feedback segment, the field is set to the same value as the associated feedback segment in the original transmission. |
| Sounding Dialog Token Number | 6 | Set to the value of the sounding dialog token of the NDPA frame. |

In a VHT Compressed Beamforming frame not carrying all or part of the VHT Compressed Beamforming Report field, the Nc Index subfield, Nr Index subfield, Channel Width subfield, Grouping subfield, Codebook Information subfield, Feedback Type subfield, and Sounding Dialog Token Number field are reserved, the First Feedback Segment field is set to 0, and the Remaining Feedback Segments field is set to 7.

The Sounding Dialog Token Number field also may be called a Sounding Sequence Number subfield.

2) The VHT Compressed Beamforming Report field is used to carry explicit feedback information in the form of angles representing compressed beamforming feedback matrices V for use by a transmit beamformer to determine steering matrices Q.

Table 6 shows the subfields of the VHT Compressed Beamforming Report field.

Ns refers to the number of subcarriers which transmit a compressed beamforming feedback matrix to the beamformer. A beamformee, by using a grouping method, can reduce the number of subcarriers Ns which transmit the compressed beamforming feedback matrix. For example, the number of beamforming feedback matrices provided as feedback information can be reduced by grouping a plurality of subcarriers into one group and transmitting a compressed beamforming feedback matrix for the corresponding group. Ns may be calculated from the Channel Width and Grouping subfields in the VHT MIMO Control field.

Table 7 illustrates the average SNR of Space-Time Stream subfield.

TABLE 6

| Subfield | Bits | Description |
|---|---|---|
| Average SNR of Space-Time Stream 1 | 8 | Signal-to-noise ratio at the beamformee for space-time stream 1 averaged over all subcarriers |
| . . . | . . . | . . . |
| Average SNR of Space-Time Stream Nc | 8 | Signal-to-noise ratio at the beamformee for space-time stream Nc averaged over all subcarriers |
| Compressed Beamforming Feedback Matrix V for subcarrier k = scidx(0) | Na × (b$\Psi$ + b$\Phi$)/2 | Order of angles in the Compressed Beamforming feedback matrix for the corresponding subcarrier |
| Compressed Beamforming Feedback Matrix V for subcarrier k = scidx(1) | Na × (b$\Psi$ + b$\Phi$)/2 | Order of angles in the Compressed Beamforming feedback matrix for the corresponding subcarrier |
| . . . | . . . | . . . |
| Compressed Beamforming Feedback Matrix V for subcarrier k = scidx(Ns − 1) | Na × (b$\Psi$ + b$\Phi$)/2 | Order of angles in the Compressed Beamforming feedback matrix for the corresponding subcarrier |

With reference to Table 6, the VHT compressed beamforming report field may include the average SNR of each space-time stream and a Compressed Beamforming Feedback Matrix V for each subcarrier. The Compressed Beamforming Feedback Matrix is a matrix including information about channel state and can be used to calculate a channel matrix (i.e., steering matrix Q) for an MIMO-based transmission method.

scidx( ) refers to subcarriers which transmit the Compressed Beamfoming Feedback Matrix subfield. Na is fixed by the Nr×Nc value (e.g., $\phi 11$, $\psi 21$, . . . for Nr×Nc=2×1).

TABLE 7

| Average SNR of Space-Time i subfield | AvgSNR_i |
|---|---|
| −128 | ≤10 dB |
| −127 | −9.75 dB |
| −126 | −9.5 dB |
| . . . | . . . |
| +126 | 53.5 dB |
| +127 | ≥53.75 dB |

With reference to Table 7, an average SNR for each stream-space stream is obtained by calculating the average SNR of all subcarriers in the corresponding channel and mapping the calculated average SNR into the range of −128 to +128.

3) The MU Exclusive Beamforming Report field is used to carry explicit feedback information in the form of delta ( ) SNRs. The information in the VHT Compressed Beamforming Report field and the MU Exclusive Beamforming Report field can be used by an MU beamformer to determine steering matrices Q.

Table 8 shows the subfields of the MU Exclusive Beamforming Report field included in a VHT compressed beamforming frame.

TABLE 8

| Subfield | Bits | Description |
| --- | --- | --- |
| Delta SNR for space-time stream 1 for subcarrier k = sscidx(0) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(0) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(1) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(1) | 4 | The deviation between the SNR of the corresponding subcarrier and the average SNR of all subcarriers for the corresponding space-time stream. |
| ... | ... | |
| Delta SNR for space-time stream 1 for subcarrier k = sscidx(Ns' − 1) | 4 | The deviation between the SNR of the corresponding subcarrier and the average SNR of all subcarriers for the corresponding space-time stream. |
| ... | ... | |
| Delta SNR for space-time stream Nc for subcarrier k = sscidx(Ns' − 1) | 4 | The deviation between the SNR of the corresponding subcarrier and the average SNR of all subcarriers for the corresponding space-time stream. |

With reference to Table 8, the MU Exclusive Beamforming Report field may include an SNR for each space-time stream for each subcarrier.

Each Delta SNR subfield has a value which is in the range −8 dB to 7 dB in 1 dB increments.

scidx( ) refers to subcarrier(s) which transmit the Delta SNR subfield. Ns refers to the number of subcarriers which transmit the Delta SNR subfield to the beamformer.

FIG. 11 is a diagram illustrating a Beamforming Report Poll frame format in a wireless communication system to which the present invention may be applied.

Referring to FIG. 11, the Beamforming Report Poll frame consists of a Frame Control field, a Duration field, an RA (Receiving Address) field, a TA (Transmitting Address) field, a Feedback Segment Retransmission Bitmap field, and an FCS.

The RA field value is the address of the intended recipient.

The TA field value is the address of the STA transmitting the Beamforming Report Poll or a bandwidth signaling TA.

The Feedback Segment Retransmission Bitmap field indicates the requested feedback segments of a VHT Compressed Beamforming report.

If the bit in position n (n=0 for LSB and n=7 for MSB) is 1, then the feedback segment with the Remaining Feedback Segments subfield in the VHT MIMO Control field equal to n is requested. If the bit in position n is 0, then the feedback segment with the Remaining Feedback Segments subfield in the VHT MIMO Control field equal to n is not requested.

Downlink (DL) MU-MIMO Frame

FIG. 12 is a diagram illustrating a DL multi-user (MU) PPDU format in a wireless communication system to which an embodiment of the present invention may be applied.

Referring to FIG. 12, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 13 is a diagram illustrating a DL multi-user (MU) PPDU format in a wireless communication system to which an embodiment of the present invention may be applied.

In FIG. 13, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 13, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 13, each VHT A-MPDU may be transmitted in a different stream.

In FIG. 13, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block Ack Procedure

FIG. 14 is a diagram illustrating a downlink MU-MIMO transmission process in a wireless communication system to which the present invention may be applied.

MI-MIMO in 802.11ac works only in the downlink direction from the AP to clients. A multi-user frame can be transmitted to multiple receivers at the same time, but the acknowledgements must be transmitted individually in the uplink direction.

Every MPDU transmitted in a VHT MU PPDU based on 802.11ac is included in an A-MPDU, so responses to A-MPDUs within the VHT MU PPDU that are not immediate responses to the VHT MU PPDU are transmitted in response to BAR (Block Ack Request) frames by the AP.

To begin with, the AP transmits a VHT MU PPDU (i.e., a preamble and data) to every receiver (i.e., STA 1, STA 2, and STA 3). The VHT MU PPDU includes VHT A-MPDUs that are to be transmitted to each STA.

Having received the VHT MU PPDU from the AP, STA 1 transmits a BA (Block Acknowledgement) frame to the AP after an SIFS. A more detailed description of the BA frame will be described later.

Having received the BA from STA 1, the AP transmits a BAR (block acknowledgement request) frame to STA 2 after an SIFS, and STA 2 transmits a BA frame to the AP after an SIFS. Having received the BA frame from STA 2, the AP transmits a BAR frame to STA 3 after an SIFS, and STA 3 transmits a BA frame to the AP after an SIFS.

When this process is performed all STAs, the AP transmits the next MU PPDU to all the STAs.

Acknowledgement (ACK)/Block ACK Frames

In general, an ACK frame is used as a response to an MPDU, and a block ACK frame is used as a response to an A-MPDU.

FIG. 15 is a diagram illustrating an ACK frame in a wireless communication system to which the present invention may be applied.

Referring to FIG. 15, the ACK frame consists of a Frame Control field, a Duration field, an RA field, and a FCS.

The RA field is set to the value of the Address 2 field of the immediately preceding Data frame, Management frame, Block Ack Request frame, Block Ack frame, or PS-Poll frame.

For ACK frames sent by non-QoS STAs, if the More Fragments subfield is set to 0 in the Frame Control field of the immediately preceding Data or Management frame, the duration value is set to 0.

For ACK frames not sent by non-QoS STAs, the duration value is set to the value obtained from the Duration/ID field of the immediately preceding Data, Management, PS-Poll, BlockAckReq, or BlockAck frame minus the time, in microseconds, required to transmit the ACK frame and its SIFS interval. If the calculated duration includes a fractional microsecond, that value is rounded up to the next higher integer.

Hereinafter, the Block Ack Request frame will be discussed.

FIG. 16 is a diagram illustrating a Block Ack Request frame in a wireless communication system to which the present invention may be applied.

Referring to FIG. 16, the Block Ack Request frame consists of a Frame Control field, a Duration/ID field, an RA field, a TA field, a BAR Control field, a BAR Information field, and a frame check sequence (FCS).

The RA field may be set as the address of the STA receiving the BAR frame.

The TA field may be set as the address of the STA transmitting the BAR frame.

The BAR Control field includes a BAR Ack Policy subfield, a Multi-TID subfield, a Compressed Bitmap subfield, a Reserved subfield, and a TID_Info subfield.

Table 9 shows the BAR Control field.

TABLE 9

| Subfield | Bits | Description |
| --- | --- | --- |
| BAR Ack Policy | 1 | Set to 0 when the sender requires immediate ACK of a data transmission. Set to 1 when the sender does not require immediate ACK of a data transmission. |
| Multi-TID | 1 | Indicates the type of the BAR frame depending on the values of the |
| Compressed Bitmap | 1 | Multi-TID subfield and Compressed Bitmap subfield. 00: Basic BAR 01: Compressed BAR 10: Reserved 11: Multi-TID BAR |
| Reserved | 9 | |
| TID_Info | 4 | The meaning of the TID_Info field depends on the type of the BAR frame. For a Basic BAR frame and a Compressed BAR frame, this subfield contains information on TIDs for which a BA frame is required. For a Multi-TID BAR frame, this subfield contains the number of TIDs. |

The BAR Information field contains different information depending on the type of the BAR frame. This will be described with reference to FIG. 17.

FIG. 17 is a diagram illustrating the BAR Information field of a Block Ack Request frame in a wireless communication system to which the present invention may be applied.

(a) of FIG. 17 illustrates the BAR Information field of Basic BAR and Compressed BAR frames, and (b) of FIG. 17 illustrates the BAR Information field of a Multi-TID BAR frame.

Referring to (a) of FIG. 17, for the Basic BAR and Compressed BAR frames, the BAR Information field includes a Block Ack Starting Sequence Control subfield.

The Block Ack Starting Sequence Control subfield includes a Fragment Number subfield and a Starting Sequence Number subfield.

The Fragment Number subfield is set to 0.

For the Basic BAR frame, the Starting Sequence Number subfield contains the sequence number of the first MSDU for which the corresponding BAR frame is sent. For the Compressed BAR frame, the Starting Sequence Control subfield contains the sequence number of the first MSDU or A-MSDU for which the corresponding BAR frame is sent.

Referring to (b) of FIG. 17, for the Multi-TID BAR frame, the BAR Information field includes a Per TID Info subfield and a Block Ack Starting Sequence Control subfield, which are repeated for each TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BAR frame is sent.

FIG. 18 is a diagram illustrating a Block Ack frame in a wireless communication system to which the present invention may be applied.

Referring to FIG. 18, the Block Ack (BA) frame consists of a Frame Control field, a Duration/ID field, an RA field, a TA field, a BA Control field, a BA Information field, and a Frame Check Sequence (FCS).

The RA field may be set as the address of the STA requesting the BA frame.

The TA field may be set as the address of the STA transmitting the BA frame.

The BA Control field includes a BA Ack Policy subfield, a Multi-TID subfield, a Compressed Bitmap subfield, a Reserved subfield, and a TID_Info subfield.

Table 10 shows the BA Control field.

TABLE 10

| Subfield | Bits | Description |
| --- | --- | --- |
| BA Ack Policy | 1 | Set to 0 when the sender requires immediate ACK of a data transmission. Set to 1 when the sender does not require immediate ACK of a data transmission. |
| Multi-TID | 1 | Indicates the type of the BA frame depending on the values of the |
| Compressed Bitmap | 1 | Multi-TID subfield and Compressed Bitmap subfield. 00: Basic BA 01: Compressed BA |

TABLE 10-continued

| Subfield | Bits | Description |
|---|---|---|
| | | 10: Reserved |
| | | 11: Multi-TID BA |
| Reserved | 9 | |
| TID_Info | 4 | The meaning of the TID_Info field depends on the type of the BA frame. For a Basic BA frame and a Compressed BA frame, this subfield contains information on TIDs for which a BA frame is required. For a Multi-TID BA frame, this subfield contains the number of TIDs. |

The BA Information field contains different information depending on the type of the BA frame. This will be described with reference to FIG. 19.

FIG. 19 is a diagram illustrating the BA Information field of a Block Ack frame in a wireless communication system to which the present invention may be applied.

(a) of FIG. 19 illustrates the BA Information field of a Basic BA frame, (b) of FIG. 19 illustrates the BA Information field of a Compressed BAR frame, and (c) of FIG. 19 illustrates the BA Information field of a Multi-TID BA frame.

Referring to (a) of FIG. 19, for the Basic BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU for which the corresponding BA frame is sent, and is set to the same value as the immediately preceding Basic BAR frame.

The Block Ack Bitmap subfield is 128 octets in length and is used to indicate the received status of a maximum of 64 MSDUs. If a bit of the Block Ack Bitmap subfield has a value of '1', it indicates the successful reception of a single MSDU corresponding to that bit position, and if a bit of the Block Ack Bitmap subfield has a value of '0', it indicates the unsuccessful reception of a single MSDU corresponding to that bit position.

Referring to (b) of FIG. 19, for the Compressed BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU or A-MSDU for which the corresponding BA frame is sent, and is set to the same value as the immediately preceding Basic BAR frame.

The Block Ack Bitmap subfield is 8 octets in length and is used to indicate the received status of a maximum of 64 MSDUs and A-MSDU. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

Referring to (c) of FIG. 19, for the Multi-TID BA frame, the BA Information field includes a Per TID Info subfield and a Block Ack Starting Sequence Control subfield, which are repeated for each TID in order of increasing TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BA frame is sent.

The Block Ack Bitmap subfield is 8 octets in length. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 20 is a diagram illustrating a high efficiency (HE) format PPDU according to an embodiment of the present invention.

FIG. 20(a) illustrates a schematic configuration of the HE format PPDU, and FIGS. 20(b) to 20(d) illustrate more detailed configurations of the HE format PPDU.

Referring to FIG. 20(a), the HE format PPDU for an HEW may basically include a legacy part (L-part: legacy-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, a HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

Also, the L-part, HE-part (or HE-preamble) may be generally called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 20(b), the HE-SIG field may be divided into a HE-SIG-A field and a HE-SIG-B field.

For example, the HE-part of the HE format PPDU may include a HE-SIG-A field having a length of 12.8 μs, an HE-STF of 1 OFDM symbol, one or more HE-LTFs, and a HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 20(b), the positions of the HE-SIG-A field and the HE-SIG-B field may be different from those of FIG. 25(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 20(c), the HE-SIG field may not be divided into a HE-SIG-A field and a HE-SIG-B field.

For example, the HE-part of the HE format PPDU may include an HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 20(d), the HE-SIG field is not divided into a HE-SIG-A field and a HE-SIG-B field, and the HE-LTF may be omitted.

For example, the HE-part of the HE format PPDU may include an HE-STF of 1 OFDM symbol and a HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for the WLAN system to which the present invention may be applied may be transmitted through at least one 20 MHz channel. For example, the HE format PPDU may be transmitted in the 40 MHz, 80 MHz or 160 MHz frequency band through total four 20 MHz channel. This will be described in more detail with reference to the drawing below.

FIG. 21 is a diagram illustrating a HE format PPDU according to an embodiment of the present invention.

FIG. 21 illustrates a PPDU format when 80 MHz is allocated to one STA (or OFDMA resource units are allocated to multiple STAs within 80 MHz) or when different streams of 80 MHz are allocated to multiple STAs, respectively.

Referring to FIG. 21, an L-STF, an L-LTF, and an L-SIG may be transmitted an OFDM symbol generated on the basis of 64 FFT points (or 64 subcarriers) in each 20 MHz channel.

Also, the HE-SIG B field may be positioned after the HE-SIG A field. In this case, an FFT size per unit frequency may be further increased after the HE-SFT (or HE-SIG B). For example, from the HE-STF (or HE-SIG-B), 256 FFTs may be used in the 20 MHz channel, 512 FFTs may be used in the 40 MHz channel, and 1024 FFTs may be used in the 80 MHz channel.

A HE-SIG-A field may include common control information commonly received by STAs which receive a PPDU.

The HE-SIG-A field may be transmitted in 1 to 3 OFDM symbols. The HE-SIG-A field is duplicated for each 20 MHz and contains the same information. Also, the HE-SIG-A field indicates full bandwidth information of the system.

Table 11 illustrates information contained in the HE-SIG-A field.

TABLE 11

| Field | Bits | Description |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 11 may be as defined in the IEEE 802.11 system. Also, the above-described fields are examples of the fields that may be included in the PPDU but not limited to them. That is, the above-described fields may be substituted with other fields or further include additional fields, and not all of the fields may be necessarily included. Another example of information included in the HE-SIG A field will be described hereinafter in relation to FIG. 34.

The HE-STF field is used to improve AGC estimation in MIMO transmission.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF, L-LTF, and L-SIG fields are transmitted through 64 FFT in a 20 MHz channel so that they can be received by a legacy STA. For example, the L-SIG field may occupy a single OFDM symbol, a single OFDM symbol time may be 4 μs, and a GI may be 0.8 μs.

An FFT size per unit frequency may be further increased from the HE-STF (or from the HE-SIG-A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 22 is a drawing illustrating an HE format PPDU according to an embodiment of the present invention.

In FIG. 22, it is assumed that 20 MHz channels are allocated to different STAs (e.g., STA 1, STA 2, STA 3, and STA 4).

Referring to FIG. 22, an FFT size per unit frequency may be further increased from the HE-SFT (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in a PPDU is the same as the example of FIG. 26, and thus, descriptions thereof will be omitted hereinafter.

The HE-SIG-B may include information specified to each STA but it may be encoded in the entire band (i.e., indicated in the HE-SIG-A field). That is, the HE-SIG-B field includes information regarding every STA and every STA receives the HE-SIG-B field.

The HE-SIG-B field may provide frequency bandwidth information allocated to each STA and/or stream information in a corresponding frequency band. For example, in FIG. 27, as for the HE-SIG-B, STA 1 may be allocated 20 MHz, STA 2 may be allocated a next 20 MHz, STA 3 may be allocated a next 20 MHz, and STA 4 may be allocated a next 20 MHz. Also, the STA 1 and STA 2 may be allocated 40 MHz and STA 3 and STA 4 may be allocated a next 40 MHz. In this case, STA 1 and STA 2 may be allocated different streams and STA 3 and STA 4 may be allocated different streams.

Also, an HE-SIG C field may be defined and added to the example of FIG. 27. Here, information regarding every STA may be transmitted in the entire band in the HE-SIG-B field, and control information specified to each STA may be transmitted by 20 MHz through the HE-SIG-C field.

Also, unlike the examples of FIGS. 21 and 22, the HE-SIG-B field may not be transmitted in the entire band but may be transmitted by 20 MHz, like the HE-SIG-A field. This will be described with reference to FIG. 26.

FIG. 23 is a diagram illustrating an HE format PPDU according to an embodiment of the present invention.

In FIG. 23, it is assumed that 20 MHz channels are allocated to different STAs (e.g., STA 1, STA 2, STA 3, and STA 4).

Referring to FIG. 23, the HE-SIG-B field is not transmitted in the entire band but is transmitted by 20 MHz, like the HE-SIG-A field. Here, however, unlike the HE-SIG-A field, the HE-SIG-B field may be encoded by 20 MHz and transmitted but may not be duplicated by 20 MHz and transmitted.

Here, an FFT size per unit frequency may be further increased from the HE-STF (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in the PPDU is the same as the example of FIG. 26, and thus, descriptions thereof will be omitted.

The HE-SIG-A field is duplicated by 20 MHz and transmitted.

The HE-SIG-B field may provide frequency bandwidth information allocated to each STA and/or stream information in a corresponding frequency band. Since the HE-SIG-B field includes information regarding each STA, information regarding each STA may be included in each HE-SIG-B field in units of 20 MHz. Here, in the example of FIG. 23, 20 MHz is allocated to each STA, but, in a case in which 40 MHz is allocated to an STA, the HE-SIG-B may be duplicated by 20 MHz and transmitted.

In a case where a partial bandwidth having a low level of interference from an adjacent BSS is allocated to an STA in a situation in which each BSS supports different bandwidths, the HE-SIG-B is preferably not transmitted in the entire band as mentioned above.

Hereinafter, the HE format PPDU of FIG. 28 will be described for the purposes of description.

In FIGS. 21 to 23, a data field, as payload, may include a service field, a scrambled PSDU, a tail bit, and a padding bit.

Meanwhile, the HE format PPDU illustrated in FIGS. 21 to 23 may be distinguished through a repeated L-SIG (RL-SIG), a repeated symbol of an L-SIG field. The RL-SIG field is inserted in front of the HE SIG-A field, and each STA may identify a format of a received PPDU using the RL-SIG field, as an HE format PPDU.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 24 is a diagram illustrating an uplink multi-user transmission procedure according to an embodiment of the present invention.

Referring to FIG. 24, an AP may instruct STAs participating in UL MU transmission to prepare for UL MU transmission, receive an UL MU data frame from these STAs, and send an ACK frame (BA (Block Ack) frame) in response to the UL MU data frame.

First of all, the AP instructs STAs that will transmit UL MU data to prepare for UL MU transmission by sending an UL MU Trigger frame 2410. Here, the term UL MU scheduling frame may be called "UL MU scheduling frame".

Here, the UL MU Trigger frame 2410 may contain control information such as STA ID (identifier)/address information, information on the allocation of resources to be used by each STA, and duration information.

The STA ID/address information refers to information on the identifier or address for specifying an STA that transmits uplink data.

The resource allocation information refers to information on uplink transmission resources allocated to each STA (e.g., information on frequency/subcarriers allocated to each STA in the case of UL MU OFDMA transmission and a stream index allocated to each STA in the case of UL MU MIMO transmission).

The duration information refers to information for determining time resources for transmitting an uplink data frame sent by each of multiple STAs.

For example, the duration information may include period information of a TXOP (Transmit Opportunity) allocated for uplink transmission of each STA or information (e.g., bits or symbols) on the uplink frame length.

Also, the UL MU Trigger frame 2410 may further include control information such as information on an MCS to be used when each STA sends an UL MU data frame, coding information, etc.

The above-mentioned control information may be transmitted in a HE-part (e.g., the HE-SIG-A field or HE-SIG-B field) of a PPDU for delivering the UL MU Trigger frame 2410 or in the control field of the UL MU Trigger frame 2410 (e.g., the Frame Control field of the MAC frame).

The PPDU for delivering the UL MU Trigger frame 2410 starts with an L-part (e.g., the L-STF field, L-LTF field, and L-SIG field). Accordingly, legacy STAs may set their NAV (Network Allocation Vector) by L-SIG protection through the L-SIG field. For example, in the L-SIG, legacy STAs may calculate a period for NAV setting (hereinafter, 'L-SIG protection period') based on the data length and data rate. The legacy STAs may determine that there is no data to be transmitted to themselves during the calculated L-SIG protection period.

For example, the L-SIG protection period may be determined as the sum of the value of the MAC Duration field of the UL MU Trigger frame 2410 and the remaining portion after the L-SIG field of the PPDU delivering the UL MU Trigger frame 2410. Accordingly, the L-SIG protection period may be set to a period of time until the transmission of an ACK frame 2430 (or BA frame) transmitted to each STA, depending on the MAC duration value of the UL MU Trigger frame 2410.

Hereinafter, a method of resource allocation to each STA for UL MU transmission will be described in more detail. A field containing control information will be described separately for convenience of explanation, but the present invention is not limited to this.

A first field may indicate UL MU OFDMA transmission and UL MU MIMO transmission in different ways. For example, '0' may indicate UL MU OFDMA transmission, and '1' may indicate UL MU MIMO transmission. The first field may be 1 bit in size.

A second field (e.g., STA ID/address field) indicates the IDs or addresses of STAs that will participate in UL MU transmission. The size of the second field may be obtained by multiplying the number of bits for indicating an STA ID by the number of STAs participating in UL MU. For example, if the second field has 12 bits, the ID/address of each STA may be indicated in 4 bits.

A third field (e.g., resource allocation field) indicates a resource region allocated to each STA for UL MU transmission. Each STA may be sequentially informed of the resource region allocated to it according to the order in the second field.

If the first field has a value of 0, this indicates frequency information (e.g., frequency index, subcarrier index, etc.) for UL MU transmission in the order of STA IDs/addresses in the second field, and if the first field has a value of 1, this indicates MIMO information (e.g., stream index, etc.) for UL MU transmission in the order of STA IDs/addresses in the second field.

In this case, a single STA may be informed of multiple indices (i.e., frequency/subcarrier indices or stream indices). Thus, the third field may be configured by multiplying the number of bits (or which may be configured in a bitmap format) by the number of STAs participating in UL MU transmission.

For example, it is assumed that the second field is set in the order of STA 1, STA 2, . . . , and the third field is set in the order of 2, 2, . . . .

In this case, if the first field is 0, frequency resources may be allocated to STA 1 and STA2, sequentially in the order of higher frequency region (or lower frequency region). In an example, when 20 MHz OFDMA is supported in an 80 MHz band, STA 1 may use a higher (or lower) 40 MHz band and STA 2 may use the subsequent 40 MHz band.

On the other hand, if the first field is 1, streams may be allocated to STA 1 and STA 2, sequentially in the order of higher-order (or lower-order) streams. In this case, a beamforming scheme for each stream may be prescribed, or the third field or fourth field may contain more specific information on the beamforming scheme for each stream.

Each STA sends a UL MU Data frame 2421, 2422, and 2423 to an AP based on the UL MU Trigger frame 2410. That is, each STA may send a UL MU Data frame 2421, 2422, and 2423 to an AP after receiving the UL MU Trigger frame 2410 from the AP.

Each STA may determine particular frequency resources for UL MU OFDMA transmission or spatial streams for UL MU MIMO transmission, based on the resource allocation information in the UL MU Trigger frame 2410.

Specifically, for UL MU OFDMA transmission, each STA may send an uplink data frame on the same time resource through a different frequency resource.

Here, each of STA 1 to STA 3 may be allocated different frequency resources for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate frequency resource 1, frequency resource 2, and frequency resource 3. In this case, STA 1 to STA 3 sequentially indicated based on the STA ID/address information may be allocated frequency resource 1, frequency resource 2, and frequency resource 3, which are sequentially indicated based on the resource allocation information. That is, STA 1, STA 2, and STA 3 may send the uplink data frame 2421, 2422, and 2423 to the AP through frequency resource 1, frequency resource 2, and frequency resource 3, respectively.

For UL MU MIMO transmission, each STA may send an uplink data frame on the same time resource through at least one different stream among a plurality of spatial streams.

Here, each of STA 1 to STA 3 may be allocated spatial streams for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate spatial stream 1, spatial stream 2, and spatial stream 3. In this case, STA 1 to STA 3 sequentially indicated based on the STA ID/address information may be allocated spatial stream 1, spatial stream 2, and spatial stream 3, which are sequentially indicated based on the resource allocation information. That is, STA 1, STA 2, and STA 3 may send the uplink data frame 2421, 2422, and 2423 to the AP through spatial stream 1, spatial stream 2, and spatial stream 3, respectively.

The PPDU for delivering the uplink data frame 2421, 2422, and 2423 may have a new structure, even without an L-part.

For UL MU MIMO transmission or for UL MU OFDMA transmission in a subband below 20 MHz, the L-part of the PPDU for delivering the uplink data frame 2421, 2422, and

2423 may be transmitted on an SFN (that is, all STAs send an L-part having the same configuration and content). On the contrary, for UL MU OFDMA transmission in a subband above 20 MHz, the L-part of the PPDU for delivering the uplink data frame 2421, 2422, and 2423 may be transmitted every 20 MHz.

As long as the information in the UL MU Trigger frame 2410 suffices to construct an uplink data frame, the HE-SIG field (i.e., a part where control information for a data frame configuration scheme is transmitted) in the PPDU delivering the uplink data frame 2421, 2422, and 2423 may not be required. For example, the HE-SIG-A field and/or the HE-SIG-B field may not be transmitted. Also, the HE-SIG-A field and the HE-SIG C field may be transmitted, but the HE-SIG-B field may not be transmitted.

An AP may send an ACK Frame 2430 (or BA frame) in response to the uplink data frame 2421, 2422, and 2423 received from each STA. Here, the AP may receive the uplink data frame 2421, 2422, and 2423 from each STA and then, after an SIFS, transmit the ACK frame 2430 to each STA.

Using the existing ACK frame structure, an RA field having a size of 6 octets may include the AID (or Partial AID) of STAs participating in UL MU transmission.

Alternatively, an ACK frame with a new structure may be configured for DL SU transmission or DL MU transmission.

The AP may send an ACK frame 2430 to an STA only when an UL MU data frame is successfully received by the corresponding STA. Through the ACK frame 2430, the AP may inform whether the reception is successful or not by ACK or NACK. If the ACK frame 2430 contains NACK information, it also may include the reason for NACK or information (e.g., UL MU scheduling information, etc.) for the subsequent procedure.

Alternatively, the PPDU for delivering the ACK frame 2430 may be configured to have a new structure without an L-part.

The ACK frame 2430 may contain STA ID or address information, but the STA ID or address information may be omitted if the order of STAs indicated in the UL MU Trigger frame 2410 also applies to the ACK frame 2430.

Moreover, the TXOP (i.e., L-SIG protection period) of the ACK frame 2430 may be extended, and a frame for the next UL MU scheduling or a control frame containing adjustment information for the next UL MU transmission may be included in the TXOP.

Meanwhile, an adjustment process may be added to synchronize STAs for UL MU transmission.

FIGS. 25 to 27 are drawings illustrating a resource allocation unit in an OFDMA multi-user transmission scheme according to an embodiment of the present invention.

When a DL/UL OFDMA transmission scheme is used, a plurality of resource units may be defined in units of n tones (or subcarriers) within a PPDU bandwidth.

A resource unit refers to an allocation unit of frequency resource for DL/UL OFDMA transmission.

One or more resource units may be allocated as DL/UL frequency resource to one STA and different resource units may be allocated to a plurality of STAs.

FIG. 25 illustrates a case in which a PPDU bandwidth is 20 MHz.

Seven DC tones may be positioned in a central frequency region of the 20 MHz PPDU bandwidth. Also, six left guard tones may and five right guard tones may be positioned on both sides of the 20 MHz PPDU bandwidth, respectively.

According to a resource unit configuration scheme such as that of FIG. 25(*a*), one resource unit may be comprised of 26 tones. Also, according to a resource unit configuration scheme such as that of FIG. 25(*b*), one resource unit may be comprised of 52 tone or 26 tones. Also, according to a resource unit configuration scheme such as that of FIG. 25(*c*), one resource unit may be comprised of 106 tone or 26 tones. Also, according to a resource unit configuration scheme such as that of FIG. 25(*d*), one resource unit may be comprised of 242 tones.

The resource unit comprised of 26 tones may include two pilot tones, the resource unit comprised of 52 tones may include four pilot tones, and the resource unit comprised of 106 tones may include four pilot tones.

In a case where a resource unit is configured as illustrated in FIG. 25(*a*), up to 9 STAs may be supported for DL/UL OFDMA transmission in the 20 MHz band. Also, in a case where a resource unit is configured as illustrated in FIG. 25(*b*), up to 5 STAs may be supported for DL/UL OFDMA transmission in the 20 MHz band. Also, in a case where a resource unit is configured as illustrated in FIG. 25(*c*), up to 3 STAs may be supported for DL/UL OFDMA transmission in the 20 MHz band. Also, in a case where a resource unit is configured as illustrated in FIG. 25(*d*), 20 MHz band may be allocated to one STA.

On the basis of the number of STAs participating in DL/UL OFDMA transmission and/or an amount of data transmitted or received by a corresponding STA, any one of the resource unit configuration schemes illustrated in FIGS. 25(*a*) to 25(*d*) may be applied or a combination of the resource unit configuration schemes of FIGS. 25(*a*) to 25(*d*) may be applied.

FIG. 26 illustrates a case in which a PPDU bandwidth is 40 MHz.

Five DC tones may be positioned in a central frequency region of the 40 MHz PPDU bandwidth. Also, 12 left guard tones and 11 right guard tones may be positioned on both sides of the 40 MHz PPDU bandwidth, respectively.

According to a resource unit configuration scheme illustrated in FIG. 26(*a*), one resource unit may be comprised of 26 tones. Also, according to a resource unit configuration scheme illustrated in FIG. 26(*b*), one resource unit may be comprised of 52 tones or 26 tones. Also, according to a resource unit configuration scheme illustrated in FIG. 26(*c*), one resource unit may be comprised of 106 tones or 26 tones. Also, according to a resource unit configuration scheme illustrated in FIG. 26(*d*), one resource unit may be comprised of 242 tones. Also, according to a resource unit configuration scheme illustrated in FIG. 26(*e*), one resource unit may be comprised of 484 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, and the resource unit comprised of 484 tones may include 16 pilot tones.

When a resource unit is configured as illustrated in FIG. 26(*a*), up to 18 STAs may be supported for DL/UL OFDMA transmission in the 40 MHz band. Also, when a resource unit is configured as illustrated in FIG. 26(*b*), up to 10 STAs may be supported for DL/UL OFDMA transmission in the 40 MHz band. Also, when a resource unit is configured as illustrated in FIG. 26(*c*), up to 6 STAs may be supported for DL/UL OFDMA transmission in the 40 MHz band. Also, when a resource unit is configured as illustrated in FIG.

26(*d*), up to 2 STAs may be supported for DL/UL OFDMA transmission in the 40 MHz band. Also, when a resource unit is configured as illustrated in FIG. 26(*e*), a corresponding resource unit may be allocated to one STA for SU DL/UL transmission in the 40 MHz band.

On the basis of the number of STAs participating in DL/UL OFDMA transmission and/or an amount of data transmitted or received by a corresponding STA, any one of the resource unit configuration schemes illustrated in FIGS. 26(*a*) to 26(*e*) may be applied or a combination of the resource unit configuration schemes of FIGS. 26(*a*) to 26(*e*) may be applied.

FIG. 27 illustrates a case in which a PPDU bandwidth is 80 MHz.

Seven DC tones may be positioned in a central frequency region of the 80 MHz PPDU bandwidth. However, in a case where the 80 MHz PPDU bandwidth is allocated to one STA (that is, in a case where a resource unit comprised of 996 tones is allocated to one STA), five DC tones may be positioned in the central frequency region. Also, 12 left guard tones and 11 right guard tones may be positioned on both sides of the 80 MHz PPDU bandwidth, respectively.

According to a resource unit configuration scheme illustrated in FIG. 27(*a*), one resource unit may be comprised of 26 tones. Also, according to a resource unit configuration scheme illustrated in FIG. 27(*b*), one resource unit may be comprised of 52 tones or 26 tones. Also, according to a resource unit configuration scheme illustrated in FIG. 27(*c*), one resource unit may be comprised of 106 tones or 26 tones. Also, according to a resource unit configuration scheme illustrated in FIG. 27(*d*), one resource unit may be comprised of 242 tones or 26. Also, according to a resource unit configuration scheme illustrated in FIG. 27(*e*), one resource unit may be comprised of 484 tones or 26 tones. Also, according to a resource unit configuration scheme illustrated in FIG. 27(*f*), one resource unit may be comprised of 996 tones.

The resource unit comprised of 26 tones may include two pilot tones, the resource unit comprised of 52 tones may include four pilot tones, the resource unit comprised of 52 tones may include four pilot tones, the resource unit comprised of 106 tones may include four pilot tones, the resource unit comprised of 242 tones may include eight pilot tones, the resource unit comprised of 484 tones may include 16 pilot tones, and the resource unit comprised of 996 tones may include 16 pilot tones.

When a resource unit is configured as illustrated in FIG. 27(*a*), up to 37 STAs may be supported for DL/UL OFDMA transmission in the 80 MHz band. Also, when a resource unit is configured as illustrated in FIG. 27(*b*), up to 21 STAs may be supported for DL/UL OFDMA transmission in the 80 MHz band. Also, when a resource unit is configured as illustrated in FIG. 27(*c*), up to 13 STAs may be supported for DL/UL OFDMA transmission in the 80 MHz band. Also, when a resource unit is configured as illustrated in FIG. 27(*d*), up to 5 STAs may be supported for DL/UL OFDMA transmission in the 80 MHz band. Also, when a resource unit is configured as illustrated in FIG. 27(*e*), up to 3 STAs may be supported for DL/UL OFDMA transmission in the 80 MHz band. Also, when a resource unit is configured as illustrated in FIG. 27(*f*), a corresponding resource unit may be allocated to one STA for SU DL/UL transmission in the 80 MHz band.

On the basis of the number of STAs participating in DL/UL OFDMA transmission and/or an amount of data transmitted or received by a corresponding STA, any one of the resource unit configuration schemes illustrated in FIGS. 27(*a*) to 27(*f*) may be applied or a combination of the resource unit configuration schemes of FIGS. 27(*a*) to 27(*f*) may be applied.

In addition, although not shown, a resource unit configuration scheme in a case where a PPDU bandwidth is 160 MHz may also be proposed. In this case, the 160 MHz PPDU bandwidth may have a structure in which the aforementioned 80 MHz PPDU bandwidth is repeated twice.

Among the entire resource units determined according to the aforementioned resource unit configuration schemes, only some resource units may be used for DL/UL OFDMA transmission. For example, in a case where resource units are configured as illustrated in FIG. 30(*a*) within 20 MHz, one resource unit is allocated to each of less than 9 STAs and the other resource units may not be allocated to any STA.

In the case of DL OFDMA transmission, a data field of a PPDU is multiplexed in a frequency domain by the resource unit allocated to each STA and transmitted.

Meanwhile, in the case of UL OFDMA transmission, each STA may configure a data field of a PPDU by the resource unit allocated thereto and simultaneously transmit the PPDU to an AP. In this manner, since each STA simultaneously transmits the PPDU, the AP, a receiver, may recognize that the data field of the PPDU transmitted from each STA is multiplexed in the frequency domain and transmitted.

Also, in a case where both DL/UL OFDMA transmission and DL/UL MU-MIMO transmission are supported, one resource unit may include a plurality of streams in a spatial domain. Also, one or more streams may be allocated as a DL/UL spatial resource to one STA, and thus, different streams may be allocated to a plurality of STAs.

For example, a resource unit comprised of 106 tones in FIG. 25(*c*) includes a plurality of streams in the spatial domain to support both DL/UL OFDMA and DL/UL MU-MIMO.

UL Sounding Method of Next-Generation System

As described above FIGS. 7 to 11, in the 802.11ac system, a feedback procedure for obtaining channel information may basically support two methods. One is a method using a control frame, and the other is a method using a channel sounding procedure not including a data field. These methods do not have a difference between a feedback procedure (or UL sounding protocol) for an UL channel and a feedback procedure (or DL sounding protocol) for a DL channel.

More specifically, if a feedback procedure is performed using a control frame, regardless of whether a target of measurement (or feedback) is a DL channel or an UL channel, a beamformer (AP or STA) requests feedback for a channel state through an HT control field, and a beamformee (STA or AP) responds to the feedback for the channel state through an HT control field. Furthermore, even in the case where a channel sounding procedure not including a data field is used, regardless of whether a target of measurement (or feedback) is a DL channel or an UL channel, a beamformer (AP or STA) transmits an NDPA frame and NDP frame for requesting feedback for a channel state, and a beamformee (STA or AP) responds to the feedback for the channel state. That is, in the existing system, regardless of whether a measuring target channel is what, the same feedback procedure was performed based on a beamformer and a beamformee.

However, in the 802.11ax system that is a next-generation WLAN system, as the OFDMA/MU-MIMO technology is introduced, a DL channel and an UL channel are different (or a DL channel state and an UL channel state are different), and an AP cannot use a DL sounding protocol in order to obtain the UL channel state. Furthermore, as the OFMDA/

MU-MIMO technology is introduced, an AP needs to be aware of channel state information about an UL channel prior to scheduling in order to efficiently schedule the UL MU transmission of STAs. Accordingly, in the next-generation WLAN system, a DL sounding procedure for obtaining the DL channel state and an UL sounding procedure for obtaining the UL channel state need to be separately defined. In this specification, although a STA is a beamformer, an AP-triggered UL sounding procedure in which an AP initiates the transmission of an UL NDP frame is to be newly defined. In this case, the AP does not need to feed corresponding information back to a STA because it uses sounding information obtained through the UL sounding procedure for scheduling for an UL MU procedure. In this case, the sounding information (or feedback information/channel state information (CSI)) may include an MCS level, the signal to noise ratio (SNR) or a beamforming feedback matrix (or beamforming feedback vector) of a predetermined feedback unit for a spatial stream. If a beamforming method is changed, the sounding information may include all of beamforming feedback values for the changed beamforming method.

First, a sounding protocol in 802.11n, that is, the existing system, is described in brief before the UL sounding procedure is described. The sounding protocol in 802.11ac has been described in FIGS. 7 to 11.

* Sounding feedback method in 802.11n system

In 802.11n, the following method of transmitting sounding information (or feedback information/CSI) through a feedback frame is present in addition to a method of piggybacking the sounding information to an HT control field and transmitting it.

1. Include a channel state information (CSI) frame—MIMO control field and a CSI report field
2. Include noncompressed/nompressed Beamforming frame—MIMO control field and noncompressed/compressed beamforming report field
3. Include antenna selection indices feedback frame—antenna selection indices field Hereinafter, a field included in each of the frames is introduced.

FIGS. 28(a) and 28(b) are diagrams illustrating a MIMO control field and an antenna selection indices field in the 802.11n system.

Referring to FIG. 28(a), the MIMO control field includes an Nc index subfield, an Nr index subfield, a MIMO Control Channel Width subfield, a Grouping (Ng) subfield, a Codebook Information subfield, a Remaining Matrix Segment subfield, a Reserved subfield and a Sounding Timestamp subfield. A description of each of the subfields is given as in Table 12 below.

TABLE 12

| Subfield | Description |
| --- | --- |
| Nc Index | Indicate a value obtained by subtracting the number of columns Nc by 1<br>In the case of Nc = 1, '0',<br>In the case of Nc = 2, '1',<br>In the case of Nc = 3, '2',<br>In the case of Nc = 4, '3' |
| Nr Index | Indicate a value obtained by subtracting the number of rows Nr by 1<br>In the case of Nr = 1, '0',<br>In the case of Nr = 2, '1',<br>In the case of Nr = 3, '2',<br>In the case of Nr = 4, '3' |
| MIMO Control Channel Width | Indicate the bandwidth of a channel to be measured<br>In the case of 20 MHz, '0'<br>In the case of 40 MHz, '1' |
| Grouping(Ng) | Indicate the number of carriers Ng grouped into one<br>In the case of Ng = 1, '0' (No grouping)<br>In the case of Ng = 2, '1'<br>In the case of Ng = 4, '2'<br>'3' is reserved bits |
| Coefficient Size | Indicate a representative bit number of real number and imaginary number parts of each element of a matrix<br>In the case of CSI the feedback,<br>In the case of Nb = 4, '0'<br>In the case of Nb = 5, '1'<br>In the case of Nb = 6, '2'<br>In the case of Nb = 8, '3'<br>In the case of noncompression beamforming feedback,<br>In the case of Nb = 4, '0'<br>In the case of Nb = 2, '1'<br>In the case of Nb = 6, '2'<br>In the case of Nb = 8, '3' |
| Codebook Information | Indicate the size of codebook entries<br>'0' in the case of 1 bit in Ψ and 3 bits in Φ<br>'1' in the case of 2 bits in Ψ and 4 bits in Φ<br>'2' in the case of 3 bits in Ψ and 5 bits in Φ<br>'3' in the case of 4 bits in Ψ and 6 bits in Φ |
| Remaining Matrix Segment | Include a remaining segment number for an associated measuring report.<br>A valid range: 0~7<br>'0' if only the last segment of a segmented report or the segment of a non-segmented report is indicated |
| Sounding Timestamp | Contains the lower 4 octets of a TSF timer value sampled at the instant that the MAC received the PHY-CCA.idication(IDLE) primitive that corresponds to the end of the reception of the sounding packet that was used to generate feedback information contained in the frame. |

Furthermore, an example of the CSI Report field (in the case of 20 MHz) is shown in Table 13.

TABLE 13

| Field | Size (bits) | Meaning |
|---|---|---|
| SNR in receive chain 1 | 8 | SNR in the first receive chain of a STA that transmits a report |
| ... | | |
| SNR in receive chain Nr | 8 | SNR in the Nr-th receive chain of a STA that transmits a report |
| CSI Matrix for carrier-28 | 3 + 2 × Nb × Nc × Nr | CSI matrix (CSI matrix coding) |
| ... | | |
| CSI Matrix for carrier-1 | 3 + 2 × Nb × Nc × Nr | CSI matrix |
| CSI Matrix for carrier 1 | 3 + 2 × Nb × Nc × Nr | CSI matrix |
| ... | | |
| CSI Matrix for carrier 28 | 3 + 2 × Nb × Nc × Nr | CSI matrix |

Furthermore, an example of the noncompressed beamforming report field for a 20 MHz channel is shown in Table 14.

TABLE 14

| Field | Size (bits) | Meaning |
|---|---|---|
| SNR for space-time stream 1 | 8 | An average SNR of a STA that transmits a report on a first space-time stream |
| ... | | |
| SNR for space-time stream Nc | 8 | An average SNR of a STA that transmits a report on an Nc-th space-time stream |
| Beamforming Feedback Matrix for carrier-28 | 2 × Nb × Nc × Nr | Beamforming feedback matrix V (V matrix coding (noncompressed beamforming)) |
| ... | | |
| Beamforming Feedback Matrix for carrier-1 | 2 × Nb × Nc × Nr | Beamforming feedback matrix V |
| Beamforming Feedback Matrix for carrier 1 | 2 × Nb × Nc × Nr | Beamforming feedback matrix V |
| ... | | |
| Beamforming Feedback Matrix for carrier 28 | 2 × Nb × Nc × Nr | Beamforming feedback matrix V |

Furthermore, an example of the Compressed beamforming report field for a 20 MHz channel is shown in Table 15.

TABLE 15

| Field | Size (bits) | Meaning |
|---|---|---|
| SNR in space-time stream 1 | 8 | An average SNR of a STA that transmits a report on a first space-time stream |
| ... | | |
| SNR in space-time stream Nc | 8 | An average SNR of a STA that transmits a report on an Nc-th space-time stream |
| Beamforming Feedback Matrix V for carrier-28 | Na × (b_Ψ + b_Φ)/2 | Beamforming feedback matrix V |
| ... | | |
| Beamforming Feedback Matrix V for carrier-1 | Na × (b_Ψ + b_Φ)/2 | Beamforming feedback matrix V |
| Beamforming Feedback Matrix V for carrier 1 | Na × (b_Ψ + b_Φ)/2 | Beamforming feedback matrix V |
| ... | | |
| Beamforming Feedback Matrix V for carrier 28 | Na × (b_Ψ + b_Φ)/2 | Beamforming feedback matrix V |

Referring to FIG. 28(a), the Antenna selection indices field includes index information of a selected antenna.

As described above, in the 802.11n system, a beamformee receives channel state information from a beamformer through various methods (or various frames). However, in the UL sounding protocol of the 802.11ax system, an AP does not need to separately feed corresponding information back to a STA because UL channel state information obtained by the AP through an NDP received from the STA is used for the scheduling of UL MU transmission. Furthermore, the STA, that is, a beamformer, does not need to feed an obtained beamforming feedback matrix back to the AP, that is, the beamformee.

The feedback frame format in the 802.11n system has been described in brief above. An AP-triggered UL sounding procedure in which an AP initiates the transmission of an UL NDP frame, which is proposed in this specification, is described in more detail below.

FIG. 29 is a diagram illustrating an UL sounding protocol according to an embodiment of the present invention.

Referring to FIG. 29, an AP may DL-transmit NDPA information indicative of the UL transmission of an NDP frame (or initiating an UL sounding protocol/procedure). In other words, the AP may DL-transmit the NDPA information for UL sounding.

Next, the AP may transmit trigger information for triggering (or indicating/signaling) the transmission method of an UL NDP frame. The trigger information may include resource allocation information for each STA that indicates (or triggers) the UL transmission resource (e.g., UL frequency/spatial resource) of an NDP frame. Alternatively, the trigger information may include information about an UL channel (UL frequency/spatial channel) whose state is to be measured by the AP.

In this case, the NDPA information and the trigger information may be carried on (or included) separate frames and DL-transmitted, or may be carried on (or included) on single frame and DL-transmitted depending on embodiments. In a first embodiment, the NDPA information may be carried on an NDPA frame and transmitted, and the trigger information may be carried on a trigger frame and transmitted. In a second embodiment, the NDPA information and the trigger information may be carried on one NDPA frame and transmitted. In this case, the trigger frame is not separately DL-transmitted. In a third embodiment, the NDPA information and the trigger information may be carried on one trigger frame and transmitted. In this case, the NDPA frame is not separately DL-transmitted. In each of the embodiments, a frame format on which the NDPA information and/or the trigger information is carried is described in detail later.

Next, a STA(s) may UL-transmit an NDP frame generated based on the received NDPA information and the trigger information. In this case, the STA(s) may UL-transmit the NDP frame using an MU or SU method. This is described in more detail later in relation to FIGS. 32 and 33.

Next, the AP may DL-transmit a polling frame including trigger information for triggering the UL NDP frame transmission of other STA(s) other than the STA(s) which has UL-transmitted the NDP frame. Alternatively, the AP may DL-transmit a polling frame including retransmission indication information for triggering the retransmission of the NDP frames of the STA(s) which has UL-transmitted the NDP frame.

Next, the STA(s) that has received the polling frame may UL-transmit an NDP frame generated based on previously received NDPA information and the information included in the polling frame. In particular, a STA(s) that previously received the NDPA information, but has not received trigger information (or has not previously transmitted an NDP frame) may generate an NDP frame based on the trigger information included in the polling frame, and may UL-transmit the generated NDP frame. Furthermore, a STA(s) that has received NDPA information and trigger information and transmitted an NDP frame, but has been instructed to retransmit an NDP frame may regenerate an NDP frame based on the trigger information included in the polling frame, and UL-retransmit the generated NDP frame.

In the case of the first embodiment in which the NDPA information and the trigger information are carried on an NDPA frame and a trigger frame, respectively, and separately transmitted, information included in the NDPA frame, the trigger frame, the polling frame and the NDP frame may be as follows.

1. The NDPA frame (or NDPA information)
   Sounding dialog token information
   The ID (AID) of at least one STA participating in an UL sounding protocol
2. The trigger frame (or trigger information)—information for the UL transmission of an NDP frame that follows after trigger frame transmission (e.g., transmitted after an SIFS after a trigger frame is transmitted)
   information about the content of the HE-SIG A field of an NDP frame
   The ID (AID) of at least one STA to transmit an NDP frame
   Type information of an HE-LTF included in an NDP frame, the number of spatial streams (Nsts) used to transmit the NDP frame, and a feedback type (i.e., whether the NDP frame is MU- or SU-transmitted or whether the transmission frequency band of the NDP frame is a full band or a partial band)
   If the NDP frame is transmitted using the MU method, frequency allocation information for the UL MU transmission of the NDP frame (resource unit information allocated to each STA for the UL MU transmission of the NDP frame)
   If the NDP frame is transmitted using the MU method, spatial resource allocation information for the UL MU transmission of the NDP frame (the index/number of a spatial stream allocated to each STA for the UL MU transmission of the NDP frame)
3. The polling frame (or polling information)—information for the UL transmission of an NDP frame that directly follows after polling frame transmission
   Substantially the same as trigger information included in a trigger frame, that is, trigger information for an NDP frame is included
   Retransmission information (if an AP fails in receiving an NDP frame transmitted after trigger frame transmission, information included to indicate that a corresponding NDP has to be retransmitted. However, this information may be replaced with trigger information for a STA that must retransmit the corresponding NDP)
4. The NDP frame FIG. 30 is a diagram illustrating the HE format of the NDP frame transmitted and received in the UL sounding protocol according to an embodiment of the present invention. The NDP frame of the HE format may be proposed in a form in which an already determined HE NDP PPDU format has been modified suitably for the sounding protocol.

Referring to FIG. 30, the UL NDP frame of the HE format may include a legacy-short training field (L-STF), a legacy-long training field (L-LTF), a legacy signal (L-SIG) field, a repeated L-SIG (RL-SIG) field, a high efficiency signal (HE-SIG) A field, a high efficiency STF (HE-STF), a high efficiency LTF (HE-LTF) and a packet extension field.

The HE-LTF may be included in the NDP frame by a number identical with or greater than the number of spatial streams used for UL transmission of the NDP frame (or the number of spatial streams allocated for the UL transmission of the NDP frame). Alternatively, the number of OFDM symbols of the HE-LTF may be included in the NDP frame by a number identical with or greater than the number of spatial streams used for UL transmission of the NDP frame (or the number of spatial streams allocated for the UL transmission of the NDP frame).

The packet extension field and the HE-SIG A field may be optionally included in the UL NDP frame depending on embodiments. In particular, the HE-SIG A field for an HE SU PPDU includes transmission information for a data field (or data part). The HE-SIG A field may be unnecessary because the NDP frame does not include a data field. Accordingly, in this case, the HE-SIG A field may be excluded from the NDP frame.

The NDP frame configured as described above may be UL-transmitted using the SU method or using the MU method according to the OFDMA/MIMO technology. If the NDP frame is transmitted using the MU method, fields from the L-STF to the HE-SIG A field that form one NDP frame may be transmitted in the same format. For example, fields from the L-STF to HE-SIG A field of one NDP frame may be UL-transmitted using the same resource unit and the same spatial stream. Furthermore, the HE-STF and the HE-LTF may be configured in an UL MU format, and the fields may be transmitted using UL MU resources allocated to each STA for the transmission of the NDP frame. An LTF size and the number of spatial streams (Nsts) forming NDP frame may be the same for each STA that transmits the NDP frame because a total value for all STA is indicated. In addition, embodiments in which the NDP frame is UL-transmitted using the SU method or the MU method are described in detail later in relation to FIGS. 31 and 32.

The embodiments of the HE format of the frame transmitted and received in the UL sounding protocol have been described above. In the aforementioned embodiments, the first embodiment in which the NDPA information and the trigger information are included in different frames, that is, the NDPA frame and the trigger frame, respectively, has been basically described. If the NDPA information and the trigger information are transmitted through different frames, respectively, as described above, there is an effect in that system complexity is reduced. The NDPA information and the trigger/polling information perform different functions in that the NDPA information includes a sounding dialog token and AID information of "all" STAs that perform an UL sounding procedure, whereas the trigger/polling information indicates AID information of "some" STAs that transmit a following NDP frame and a transmission method of the following NDP frame. Accordingly, it may be efficient to transmit the NDPA information and the trigger/polling information through different frames. In such context, in a DL sounding protocol procedure, the trigger information may be included in an SU/MU NDP frame and transmitted or may be included in a separate trigger frame and transmitted.

In addition, an embodiment of a frame in which the NDPA information and the trigger information are transmitted is not limited to the aforementioned first embodiment, and the NDPA information and the trigger information may be included in one NDPA frame (or trigger frame) and transmitted (second and third embodiments). In this case, information included in each frame may be different.

FIG. 31 is a diagram illustrating frames transmitted and received in the UL sounding protocol according to an embodiment of the present invention. The description of FIGS. 29 and 30 may be identically applied to this drawing, and a redundant description is omitted. Furthermore, the second embodiment in which the NDPA information and the trigger information are included in an NDPA frame and transmitted is described, but the present invention is not limited thereto. The following description may be applied to the first and the third embodiments in the same/similar manner.

Referring to FIG. 31, as described above in relation to FIG. 29, an AP may transmit an NDPA frame (including NDPA information and trigger information). NDPA information and trigger information may have been included in the corresponding NDPA frame. In this case, the NDPA frame may be duplicated in a 20 MHz subchannel unit and transmitted. FIG. 31 is a diagram illustrating a case where the entire transmission channel (or bandwidth) of a DL PPDU on which the NDPA frame is carried is 80 MHz.

Trigger information included in the NDPA frame may indicate an UL MU transmission method of the NDP frame. STAs that have received the NDPA frame may UL-MU-transmit the NDP frame based on the trigger information included in the NDPA frame. In the case of the embodiment shown in this drawing, the trigger information of the NDPA frame may indicate a spatial stream index allocated to each STA, and the NDP frames may be UL-MU-transmitted using the spatial stream allocated to each STA. This drawing illustrates only a case where the NDP frame is spatial-multiplexed and UL-MU-transmitted, but the NDP frame may be frequency-multiplexed and UL-MU-transmitted.

The AP that has received the NDP frame may transmit an ACK frame in response to the received NDP frame. Furthermore, the AP may DL-transmit a polling frame for indicating the UL transmission of an NDP frame to a STA(s) that belongs to STAs participating in the UL sounding protocol, but have not UL-transmitted an NDP frame. Alternatively, the AP may also DL-transmit a polling frame for indicating the retransmission of an NDP frame whose reception has failed. In this case, if an ACK frame and polling frame for the same STA are present, the AP may combine the corresponding frames, may carry it on one DL PPDU (or one frame), and may DL-transmit the DL PPDU. An STA(s) that has received the ACK/polling frame may UL-transmit an NDP frame in response to the received frame. The AP may DL-transmit the ACK frame again in response to the received NDP frame.

In accordance with the aforementioned contents, the NDP frame may be UL-transmitted using various methods (e.g., using SU/MU method) according to the indication of the AP. A more detailed embodiment in which the AP indicates the transmission method of the NDP frame may be the same as FIG. 32.

FIG. 32 is a diagram illustrating various embodiments regarding the UL SU/MU transmission method of an NDP frame according to embodiments of the present invention. More specifically, FIG. 32(a) is a diagram regarding the UL SU transmission method of an NDP frame, and FIGS. 32(b) and 32(c) are diagrams showing embodiments the UL MU transmission method of an NDP frame.

Referring to FIG. 32(a), an AP may instruct each STA to transmit an NDP frame using the SU method. More specifically, the AP may transmit an NDPA frame indicative of the UL SU transmission of an NDP frame for each STA. Each STA may generate an NDP frame based on information (NDPA information and trigger information) included in the received NDPA frame, and may SU-transmit the generated NDP frame.

For example, the AP may instruct a STA 1 to UL-SU-transmit an NDP frame using all of UL resources (or using the entire frequency/spatial region) allocated for the transmission of the NDP frame through the NDPA frame. The STA 1 may generate an NDP frame based on the received NDPA frame and may UL-SU transmit the generated NDP frame. When the NDP frame is normally received from the STA 1, the AP may indicate the UL SU transmission of an NDP frame by transmitting an NDPA frame to a STA 2 participating in an UL sounding protocol along with an ACK frame for the STA 1. Alternatively, the AP may indicate the UL SU transmission of an NDP frame by transmitting an NDPA frame to a next STA without an ACK frame. The STA 2 may generate an NDP frame based on the received NDPA frame and may UL-SU transmit the generated NDP frame.

Referring to FIG. 32(b), an AP may instruct each STA to transmit an NDP frame using the MU method (i.e., UL OFDMA transmission or UL MU MIMO transmission). More specifically, the AP may transmit an NDPA frame indicative of the UL MU transmission of an NDP frame for each STA. Each STA may generate an NDP frame based on information (NDPA information and trigger information) included in the received NDPA frame, and may MU-transmit the generated NDP frame. In this case, trigger information about spatial resources and/or frequency resources allocated to each STA as resources for UL-MU-transmitting the NDP frame may have been included in the NDPA frame.

For example, the AP may indicate UL MU resources allocated to STAs 1 and 2 for the transmission of the NDP frame through the NDPA frame. In this case, frequency resource unit allocation information and/or frequency channel information allocated to each of the STAs 1 and 2 for the UL MU transmission of the NDP frame may be included in the NDPA frame. The STAs 1 and 2 that have received the NDPA frame may UL-MU-transmit NDP frames using the respective frequency resources allocated thereto. Alternatively, spatial stream index information and/or spatial stream number information allocated to each of the STAs 1 and 2 for the UL MU transmission of the NDP frame may be included in the NDPA frame. The STAs 1 and 2 that have received the NDPA frame may UL-MU-transmit NDP frames using the respective spatial resources allocated thereto.

In the present embodiment, STAs for which the UL MU transmission of an NDP frame (i.e., UL OFDMA transmission or UL MU MIMO transmission) has been instructed may transmit the same signal through the entire frequency/spatial region allocated to the STAs in the case of a legacy preamble. Likewise, in the case of an HE-STF, STAs may transmit the same signal through the entire frequency/spatial region. Alternatively, in the case of UL OFDMA transmission, STAs may transmit HE-STFs depending on the number of indicated spatial streams through only respective frequency regions (or frequency unit) allocated thereto. In the case of UL MU MIMO transmission, STAs transmit HE-LTFs depending on the number of indicated spatial streams using respective spatial streams allocated thereto.

In this case, assuming that the spatial streams have been sequentially allocated to the respective STAs, each STA can be aware of the start index of the spatial stream allocate there to by accumulating and calculating previous spatial stream indices. Alternatively, each STA may transmit an HE-LTF using the spatial stream of a new index different from the index of spatial streams used by other STAs.

For example, if the STA 1 and the STA 2 have been instructed to perform UL MU transmission using two spatial streams, the STAs 1 and 2 may transmit HE-LTFs sequentially using two stream indices from a stream index 1. That is, the STA 1 may transmit an HE-LTF using 1~2 stream indices, the STA 2 may transmit an HE-LTF using 3~4 stream indices (or the STA 1 may UL-MU-transmit an HE-LTF corresponding to the 1~2 stream indices, and the STA 2 may UL-MU-transmit an HE-LTF corresponding to the 3~4 stream indices). In some embodiments, the STA 1 may transmit the HE-LTF using (or corresponding to) two spatial streams having specific stream indices, and the STA 2 may transmit HE-LTF using (or corresponding to) two spatial streams having new indices different from the stream indices of the STA 1.

Alternatively, in order for a plurality of STAs to efficiently perform an UL sounding protocol, the HE-LTF may be transmitted using frequency resources discontiguously located in a frequency band.

FIG. 33 is a diagram illustrating the UL MU transmission method of an HE-LTF within an NDP frame according to an embodiment of the present invention.

Referring to FIG. 33, each STA may UL-MU transmit an HE-LTF using frequency resources allocated thereto. In this case, the frequency resources allocated to each STA may be discontiguously located in a frequency band. One box shown in this drawing means frequency resources allocated to each STA for the transmission of an HE-LTF (a 1×, 2× or 4× HE-LTF). Tones to which the HE-LTF (a 1×, 2× or 4× HE-LTF) is mapped in each box may correspond to a frequency unit grouped in a predetermined tone unit. As described above, each STA may map its own HE-LTF (1×, 2× or 4× HE-LTF) (or 1×, 2× or 4× HE-LTF corresponding to a spatial stream allocated thereto) to tones that are allocated thereto and included in the frequency units which are discontiguously located. And each STA may UL-MU-transmit the tones.

Referring back to FIG. 32(b), an AP that has received an NDP frame may DL-MU-transmit an ACK frame providing notification of the normal reception of the NDP frame. In this case, the operation of the AP may be optionally performed depending on embodiments.

Referring to FIG. 32(c), the embodiments of FIGS. 32(a) and 32(b) may be combined, and thus an NDP frame may be transmitted. That is, an AP instructs STAs to UL-MU-transmit NDP frames and also may instruct the STAs to UL-MU-transmit NDP frames contiguously after the NDP frame transmission of other STAs. For example, the AP may instruct STAs 1 and 2 to UL-MU-OFDMA-transmit NDP frames through an NDPA frame. The STAs 1 and 2 may UL-MU-transmit the NDP frames using frequency resources (or resource units) allocated thereto. Next, the AP may instruct STAs 3 and 4 to UL-MU-OFDMA-transmit NDP frames through the NDPA frame. In this case, the AP may transmit an ACK frame to the STAs 1 and 2 as a response to the NDP frames received from the STAs 1 and 2 along with the NDPA frame. The STAs 3 and 4 may UL-MU-transmit the NDP frames using frequency resources (or resource units) allocated thereto.

As described above, the NDP frame may be UL-transmitted in various manners. If the NDP frame is UL-OFMDA-transmitted, it is necessary to determine a frequency resource unit allocated to each STA for the UL MU transmission of the NDP frame (or it is necessary for the AP to determine an UL channel measuring frequency unit for measuring a channel state). Hereinafter, a frequency resource unit (or a frequency resource allocated for NDP frame transmission in an UL sounding protocol) allocated for the UL MU transmission of an NDP frame is referred to as a 'measuring frequency resource (MFR)' in order to distinguish it from a 'resource unit' allocated for the UL MU transmission of a general data frame.

FIG. 34 is a diagram illustrating a measuring frequency resource (MFR) according to an embodiment of the present invention.

Referring to FIG. 34, the MFR may include at least one resource unit (or may include at least one resource unit). In this case, a different index may be allocated to each MFR including at least one resource unit. For example, a 996-tone resource unit of a 80 MHz channel may be defined as one MFR, and an index 0 may be allocated to the corresponding MFR. Furthermore, an MFR may be defined in a 484-tone resource unit unit in the 80 MHz channel. An index 1 may be allocated to the first 484-tone resource unit of the 80 MHz channel, and the index 2 may be allocated to the second 484-tone resource unit of the 80 MHz channel. Likewise, the MFR may be determined (or defined) in a specific resource unit, and an index may be allocated to each MFR.

An AP may indicate a frequency resource for the UL MU transmission of an NDP frame using an index allocated to each MFR as described above. More specifically, the AP may indicate a frequency resource allocated to each STA by transmitting index information of an MFR allocated to each STA for the UL MU transmission of an NDP frame (or for the measuring of an UL channel state). In this case, a field configured to DL-transmit MFR index information (or frequency resource information) allocated to each STA may be configured as in Table 16.

TABLE 16

| Index | Description |
|---|---|
| 0 | Bandwidth indicated in an MFB field or the entire BW of a DL PPDU |
| 1 | Bandwidth that own a DL MU PPDU is transmitted or bandwidth in which previous feedback is used |
| 2 | MFR index 1 |
| 3 | MFR index 2 |
| 4 | MFR index 3 |
| 5 | MFR index 4 |
| 6 | MFR index 5 |
| 7 | MFR index 6 |

In this case, if an AP allocates a plurality of MFRs to one STA, an index indicative of a combination of the plurality of allocated MFR indices may be additionally included in Table 16. In this case, the plurality of MFRs allocated to each STA may be contiguously or discontiguously located in a frequency domain.

Such MFR information (or frequency resource information) may be included in the NDPA frame or trigger frame as trigger information and may be DL-transmitted to each STA, and a more detailed description thereof is given later.

As described above in connection with FIG. 29, the NDPA information and the trigger information may be carried on different frames and DL-transmitted or may be carried on one frame and DL-transmitted. In particular, in an embodiment in which the NDPA information and the trigger information are carried on one (or the same) frame and DL-transmitted, it is necessary to newly define the format of a corresponding frame in a next-generation system because the format has not yet been defined in the existing systems. Accordingly, hereinafter, there is newly proposed the HE format of an NDPA frame or trigger frame including NDPA information and trigger information.

1. HE Format of NDPA Frame

In one embodiment, there is proposed that the NDPA frame (refer to FIG. 8) defined in the existing system is reused as an NDPA frame including NDPA information and trigger information, and an example of this is shown in Table 17. A description overlapped with the description of FIG. 8 in relation to Table 17 is omitted, and a difference with the VHT NDPA frame is chiefly described.

If the feedback type field indicates NDP frame transmission using a partial band, each STA needs to be additionally aware that an MFR allocated thereto is what. Accordingly, an MFR allocated for NDP frame transmission may be indicated for each STA using the 2 bits allocated for MFR indication. In this case, the bits for MFR indication may indicate the index of an MFR used for an NDP frame to be UL-MU-transmitted or may indicate subchannel information (e.g., an n-th 20 MHz subchannel of a 80 MHz channel).

TABLE 17

| Frame control | 2 | | |
|---|---|---|---|
| Duration | 2 | in microseconds | |
| RA | 6 | receive address of receiving station address | |
| | | if STA-1, RA = STA info1, if not, RA = broadcast address | |
| TA | 6 | transmitter address or transmitting station address | |
| Sounding Dialog Token | 1 | Rsv(2) | 00: existing VHT NDPA Frame |
| | | | 01: $NDPA_{UL}$ frame |
| | | | 10~11: Rsv |
| | | Sounding Dialog Token Number (6) | selected by the beamformer to identify the VHT NDPA |
| STA info 1~n | 2 × n | AID (11) | in $NDPA_{UL}$ frame, |
| | | | 11 bits association identifier |
| | | Feedback type (1) | in $NDPA_{UL}$ frame, |
| | | | 0 for UL NDP transmission in Full band |
| | | | 1 for UL NDP transmission only in frequency band MFR |
| | | NC index (2) | in $NDPA_{UL}$ frame, |
| | | | Nc index-0 |
| | | MFR (2) | in $NDPA_{UL}$ frame, |
| | | | When Feedback type = 0, rsv |
| | | | When Feedback type = 1, MFR index |
| FCS | 4 | | |

Referring to Table 17, 2 bits set as reserved bits in the sounding dialog token field in a conventional technology may be used as an indicator indicating that a corresponding NDPA frame is an NDPA frame for initiating an UL sounding protocol. For example, if reserved bits within a sounding dialog token field are set as '00', a corresponding NDPA frame may indicate that it is the NDPA frame of the existing VHT format. If the reserved bits within the sounding dialog token field are set as '01', it may indicate that a corresponding NDPA frame is an NDPA frame (of the HE format) for initiating an UL sounding protocol. In this case, a bit value indicative of each of pieces of information is not limited thereto, and may be set to another bit value. Alternatively, only 1 bit of the reserved bits of a sounding dialog token field may be used as an indicator indicating that a corresponding NDPA frame is an NDPA frame for UL sounding, and the remaining 1 bit may be left as a reserved bit.

Furthermore, the bit size of the AID field in the NDPA frame is reduced from 12 bits to 11 bits (an NDPA frame is always transmitted by an AP and a corresponding field has only to be a 11-bit size in 802.11ax), and the Nc index field is reduced from 3 bits to 2 bits (the subject that transmits an NDP frame is a STA, and the STA can transmit a maximum of four spatial streams). Accordingly, marginal bits of 2 bits are generated, and the 2 bits may be used for MFR indication (or a frequency information field).

Unlike in a conventional technology, the feedback type field may be used for a STA to transmit an NDP frame in a full band (or whether the NDP frame will be UL-SU-transmitted) or a partial band (or whether the NDP frame will be UL-MU-transmitted). For example, if the feedback type field is set to '0', it indicates that an STA will UL-transmit an NDP frame in a full band. In contrast, if the feedback type field is set to '1', it indicates that a STA will UL-MU-transmit an NDP using an MFR.

Alternatively, unlike in that described above, the Nc index value may be always fixed to 4, and the 2 bits of the Nc index field may be added as bits for MFR indication. Alternatively, the Nc index value may be indicated using the reserved bits of a sounding dialog token field, and the 2 bits of the Nc index field may also be added as bits for MFR indication. Accordingly, in this case, the bits for MFR indication (or the frequency information field) may include a total of 4 bits and indicate more various and detailed MFR information.

The bits for MFR indication (or the frequency information field) may be used as reserved bits if the feedback type field indicates the UL SU transmission of an NDP frame (e.g., if the feedback type field is set to '0'). If the feedback type field indicates the UL MU transmission of an NDP frame (e.g., if the feedback type field is set to '1'), the bits for MFR indication may be used for MFR indication.

If STAs to which the same frequency band has been allocated is plural, each STA may determine an Nc index (or a spatial stream index) (or the index of a spatial stream used to UL-transmit an NDP frame) to be transmitted by each STA by taking into consideration the spatial stream indices of other STAs. More specifically, each STA may obtain its own spatial stream index by accumulating and calculating index of the spatial stream of the previous STA. For example, if a full band has been allocated to STAs 1 and 2, Nc indices are 2 and 2, the STA 1 transmits an UL NDP frame using the spatial stream indices 1 and 2 (or spatial stream corresponding to the indices 1 and 2), and the STA 2 transmits an UL NDP frame using spatial stream indices 3 and 4 (or spatial stream corresponding to indices 3 and 4).

As described above, the NDPA frame may be configured by reusing the NDPA frame of the existing system. However, in other embodiments, the NDPA frame of an HE format may be newly defined as in Table 18.

TABLE 18

| Frame control | 2 | HE NDPA frame for UL sounding | |
|---|---|---|---|
| Duration | 2 | in microseconds | |
| RA | 6 | receive address of receiving station address if STA = 1, RA = STA info1, if not, RA = broadcast address | |
| TA | 6 | transmitter address or transmitting station address | |
| Sounding Dialog Token | 1 | Rsv(2) | 00: $NDPA_{UL}$ frame 01~11: Rsv |
| | | Sounding Dialog Token Number (6) | selected by the beamformer to identify the VHT NDPA |
| STA info 1~n | 2 × n | AID (11) | in $NDPA_{UL}$ frame, 11 bits association identifier |
| | | Feedback type (1) | in $NDPA_{UL}$ frame, 0 for UL NDP transmission in Full band 1 for UL NDP transmission only in frequency band MFR |
| | | NC index (3) | in $NDPA_{UL}$ frame, Nc index-0 |
| | | MFR (TBD) aforementioned MFR description is applied | in $NDPA_{UL}$ frame, When Feedback type = 0, rsv When Feedback type = 1, MFR index |
| FCS | 4 | | |

The description of Table 18 may be identically applied to the description of Table 17. However, there is a difference in that a bit number for MFR indication can be configured without a limit. There is an effect in that a combination of various MFRs can be indicated in detail because there is no limit to bit number for MFR indication as described above.

2. HE Format of Trigger Frame

In one embodiment, a trigger frame including NDPA information and trigger information may be newly defined. This may also be expressed, such as that an "NDPA frame may be newly defined as one type of trigger frame." To this end, first, the HE format of the trigger frame determined so far is described.

FIG. 35 is a diagram illustrating the HE format of a trigger frame.

Referring to FIG. 35, the trigger frame may include a Frame control field, a Duration field, an (A1) field (or an (RA) field), an A2 field (or a TA field), a Common Info field (or a common information field), a Per User Info N field (or a user-specific field) and FCS.

The RA field indicates the address of a reception STA. The RA field may be included in or excluded from the trigger frame depending on embodiments.

The TA field indicates the address of a STA that transmits the trigger frame.

The Common Info field indicates a field including trigger information in common received by STAs that receive the trigger frame. The Common Info field may include a Trigger type field, a Trigger common info field and a Type-specific common info field. Furthermore, the Trigger common info field may include a Max. UL PPDU length field, a BW field, a GI field, an LTF type field and an LTF Num field. The Max. UL PPDU length field indicates the (maximum) length of an UL MU PPDU triggered by the trigger frame. The BW field indicates the transport bandwidth of a corresponding UL MU PPDU. The GI field indicates a guard interval applied to a corresponding UL MU PPDU (or indicates a guard interval used when a corresponding UL MU PPDU is generated). The LTF type field indicates the LTF type of a corresponding UL MU PPDU. The LTF Num field indicates the number of HE-LTFs included in a corresponding UL MU PPDU.

The Per User Info N field indicates a field including trigger information individually received by each STA. Accordingly, the Per User Info N field may be included in the trigger frame by a number corresponding to the number of STAs. The Per User Info N field may include a Trigger Per User Info N and a Type-specific Per User Info N field. MCS information, coding information, stream number (Nsts) information, TxBF (Tx beamforming) information and space-time block coding (STBC) information, used for a specific STA that receives a corresponding field to generate/transmit an UL MU frame, may be included in the Trigger Per User Info N field.

The Trigger common info field and Trigger STA info field include a variety of types of information for the allocation region of an UL MU PPDU frame and an UL MU transmission method. The Type-specific common info field and the Type-specific Per User Info field are fields added if there is information required be separately included depending on the type of trigger frame. The trigger frame of the type (or NDPA frame type) newly defined in this specification may include NDPA information and/or trigger information about the fields for the UL transmission of an NDP frame, and this is described in detail later in connection with FIG. 36.

FIG. 36 is a diagram illustrating the HE format of the trigger frame according to an embodiment of the present invention.

Referring to FIG. 36(a), the Type-specific common info field of the trigger frame newly defined for an UL sounding protocol may be replaced with (or may include) the sounding dialog token field of an NDPA frame. Accordingly, a corresponding Type-specific common info field (or sounding dialog token field) includes sounding dialog token information selected to identify the trigger frame. Furthermore, the Type-specific Per User Info field may be replaced with (or may include) a feedback type field (indicates the UL SU or MU transmission of an NDP frame), an Nc index field (indicates the Nc index of the NDP frame) and an MFR indication field (indicates the MFR of the NDP frame).

In this case, the Nc index field and the MFR indication field may be replaced with the stream number (Nsts) field and resource unit (RU) allocating field of the Trigger STA Info N field. In this drawing, the RU allocation field is not separately shown, and the corresponding field may be included in a Trigger common information field or a Trigger STA info N field depending on a resource allocation method.

A field that provides notification of a data configuration method may not be necessary because an UL MU PPDU triggered by this trigger frame (or transmitted using this trigger frame) includes an UL NDP frame (i.e., does not include a data field). That is, in the Trigger common information field, the Max. UL PPDU length field, the GI field and/or the Trigger STA info N field may not be necessary. Accordingly, the corresponding fields may be left as reserved bits or deleted for commonality with the trigger frame of a different type.

As a method of configuring another trigger frame, referring to FIG. 36(b), the trigger frame of an NDPA frame format may be configured by adding only a sounding dialog token field to a general trigger frame. That is, the basic format of a trigger frame is used without any change, but only the sounding dialog token field may be added to the Common info field.

In this case, in the MFR indication field, the RU allocation field of the Trigger STA Info N field acts as the MFR indication field instead and indicates MFR information. That is, the RU allocation field may indicate an MFR (e.g., MFR index) for an NDP UL frame. The Max. UL PPDU length field, the GI field and/or Coding type information, TxBF information, STBC information, etc may be unnecessary because an UL MU PPDU triggered by this trigger frame (or transmitted using this trigger frame) includes an UL NDP frame (i.e., does not include a data field). Accordingly, the corresponding field/information may be left as reserved bits or deleted.

The trigger STA Info N field (or the STA Info N field) may include the feedback type field (indicate the UL SU or MU transmission of an NDP frame). Contents (or a field) that follows the corresponding field may be determined depending on contents indicated by the feedback type field. For example, if the feedback type field indicates UL SU transmission, the corresponding field may be followed by (or may included) a field indicative of the number of spatial streams (Nsts) used for NDP UL frame transmission, a Tx Beamforming (TxBF) field and a space-time block coding (STBC) field. Alternatively, if the feedback type field indicates UL MU transmission, the corresponding field may be followed by (or may include) the number of spatial streams (Nsts) used for NDP UL frame transmission and fields indicative of respective indices.

In the case of the present embodiment, the type of trigger frame is not separately defined as an UL NDPA frame type or a trigger frame for UL sounding, but may be defined as a single 'trigger frame type for sounding' regardless of the UL/DL. Instead, the reserved bits (2 bits) of the sounding dialog token field may be used to identify whether the trigger frame is a frame for an UL sounding protocol or a frame for a DL sounding protocol. In the case of the UL, the Type-specific Per User Info field may not be present.

The HE format of each frame has been described above if the NDPA information and the trigger information are included in the NDPA frame or the trigger frame. The frame formats introduced in the aforementioned embodiments may be configured by adding new fields or jointly combining the fields depending on embodiments or some fields may be excluded from the frame formats. Furthermore, in the above descriptions, the 'field' may be replaced with 'information.'

Hereinafter, a second embodiment, that is, an UL sounding protocol if the NDPA information and the trigger information are included in an NDPA frame and transmitted, is described in detail.

FIG. 37 is a diagram illustrating an UL sounding protocol according to an embodiment of the present invention.

Referring to FIG. 37, an AP may DL-MU-transmit an NDPA frame that initiates an UL sounding protocol. In this case, the NDPA frame may be configured as in the example of Table 17 or Table 18. MFR index information and index information of a spatial stream may have been included in the NDPA frame as trigger information for the UL MU transmission of an NDP frame. In the case of this drawing, the NDPA frame may indicate an MFR index 1 for a STA 1, an MFR index 2 for a STA 2 and an MFR index 0 for a STA 3 as information for the UL OFDMA transmission of NDP frames. Furthermore, the NDPA frame may indicate stream indices 1 and 2 for the STA 1, stream indices 1 and 2 for the STA 2 and stream indices 3 and 4 for the STA 3 as information for the MU MIMO transmission of NDP frames.

Next, the STA generates an NDP frame based on an NDPA frame, and may UL-MU-transmit the NDP frame. Accordingly, the STA 1 may UL-MU-transmit the NDP frame using a frequency resource corresponding to the MFR index 1 and a spatial resource corresponding to the stream indices 1 and 2. Furthermore, the STA 2 may UL-MU-transmit the NDP frame using a frequency resource corresponding to the MFR index 2 and a spatial resource corresponding to the stream indices 1 and 2. Furthermore, the STA 3 may UL-MU-transmit the NDP frame using a frequency resource corresponding to the MFR index 0 and a spatial resource corresponding to the stream indices 3 and 4.

The AP that has received a corresponding NDP frame may measure and obtain an UL channel state based on the training field (e.g., HE-LTF) of the received NDP frame. Accordingly, the AP may use the measured UL channel state to efficiently allocate UL MU frequency/spatial resources to each STA. UL MU resource allocation information for each STA may be carried on a trigger frame and transmitted to each STA.

Next, the AP may DL-transmit an NDPA frame (or polling frame) that indicates MFR indices 3 to 6 with respect to STAs 4 to 7, respectively, and indicates stream indices 1 to 4 for all of the STAs 4 to 7. The STAs 4 to 7 that have received the corresponding NDPA frame may UL-MU-transmit respective NDP frames using the instructed UL MU resources.

FIG. 38 is a flowchart illustrating the UL sounding support method of a STA device according to an embodiment of the present invention. The embodiments described above in connection with the present sequence diagram may be applied in the same manner. Accordingly, a redundant description is hereinafter omitted.

Referring to FIG. 38, first, a STA may receive NDPA information indicative of the UL transmission of an NDP frame (S3810). In this case, sounding dialog token information and/or ID (AID) information of at least one STA participating in an UL sounding protocol may have been included in the NDPA information.

Next, the STA may receive trigger information indicative of the UL MU transmission resources of the NDP frame (S3820). In this case, frequency resource information and/or spatial resource information allocated to the STA for the UL MU transmission of the NDP frame may have been included in the trigger information. In this case, the frequency resource information may indicate an MFR used for the UL MU transmission of the NDP frame. The spatial resource information may indicate the number of spatial streams/indices used for the UL MU transmission of the NDP frame. In addition, information about the content of the HE-SIG A field of the NDP frame, the ID (AID) of at least one STA that will transmit the NDP frame, type information of an HE-LTF included in the NDP frame, the number of spatial streams (Nsts) used to transmit the NDP frame, feedback type (i.e., whether the NDP frame will be MU- or SU-transmitted) information, etc. may have been additionally included in the trigger information.

Next, the STA may UL-MU-transmit the NDP frame using the UL MU transmission resources indicated by the trigger information. More specifically, the STA may UL-MU-transmit the NDP frame by using the MFR indicated by the frequency resource information and the spatial stream indicated by the spatial resource information.

Although not shown in the present sequence diagram, an AP that has received the NDP frames from the STAs may obtain UL channel state information by measuring an UL channel state based on the training field of the received NDP frames. The AP may subsequently use the obtained UL channel state information to efficiently allocate resources for the UL MU transmission of each STA.

The NDPA information and the trigger information may be carried on different frames and DL-transmitted, or may be carried on the same one frame and DL-transmitted depending on embodiments as described above. If the NDPA information and the trigger information are included in an NDPA frame and transmitted, an NDPA frame format may be configured as in the example of Table 17 or Table 18. Alternatively, if the NDPA information and the trigger information are included in a trigger frame, a trigger frame format may be configured as in the example of FIG. 36.

FIG. 39 is a block diagram of each STA device according to an embodiment of the present invention.

In FIG. 39, an STA device 3910 may include a memory 3912, a processor 3911 and an RF unit 3913. And, as described above, the STA device may be an AP or a non-AP STA as an HE STA device.

The RF unit 3913 may transmit/receive a radio signal with being connected to the processor 3911. The RF unit 3913 may transmit a signal by up-converting the data received from the processor 3911 to the transmission/reception band.

The processor 3911 may implement the physical layer and/or the MAC layer according to the IEEE 802.11 system with being connected to the RF unit 4013. The processor 3911 may be constructed to perform the operation according to the various embodiments of the present invention according to the drawings and description. In addition, the module for implementing the operation of the STA 3910 according to the various embodiments of the present invention described above may be stored in the memory 3912 and executed by the processor 3911.

The memory 3912 is connected to the processor 3911, and stores various types of information for executing the processor 3911. The memory 3912 may be included interior of the processor 3911 or installed exterior of the processor 3911, and may be connected with the processor 3911 by a well known means.

In addition, the STA device 3910 may include a single antenna or a multiple antenna.

The detailed construction of the STA device 3910 of FIG. 39 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

MODE FOR INVENTION

Various embodiments of present invention are described in best mode.

INDUSTRIAL APPLICABILITY

While a frame transmission scheme in a wireless communication system according to the present invention has been described with respect to its application to an IEEE 802.11 system, it also may be applied to other various wireless communication systems than the IEE 802.11 system.

The invention claimed is:

1. A method for supporting UL sounding of a station (STA) for measuring an uplink (UL) channel state in a wireless LAN (WLAN) system, the method comprising steps of:
receiving, from an Access Point (AP), null data packet (NDP) announcement (NDPA) information related to an UL transmission of an NDP frame;
receiving, from the AP, trigger information for an UL multi-user (MU) transmission resource of the NDP frame; and
UL MU-transmitting, to the AP, the NDP frame using the UL MU transmission resource indicated by the trigger information, wherein the trigger information comprises at least one of spatial resource information or frequency resource information to be used for the UL MU transmission of the NDP frame, wherein the NDPA information is received on a NDPA frame, and wherein the NDPA frame includes a sounding token field for identifying a format of the NDPA frame, wherein the spatial resource information includes an index of at least one spatial stream to be used for the UL transmission of the NDP frame.

2. The method of claim 1, wherein the frequency resource information includes an index of at least one measuring frequency resource unit to be used for the UL transmission of the NDP frame.

3. The method of claim 1, wherein the trigger information is received on a trigger frame.

4. The method of claim 1, wherein the NDPA frame further includes association identifier (AID) information of STAs which are to transmit the NDP frame.

5. The method of claim 3, wherein the trigger frame comprises at least one of association identifier (AID) information of the STAs which are to transmit the NDP frame, the frequency resource information of the NDP frame and the spatial resource information of the NDP frame.

6. The method of claim 5, wherein, when the NDP frame is included in an UL physical protocol data unit (PPDU) and transmitted, the trigger frame further comprises feedback type information indicating whether the NDP frame is transmitted in a full band of the UL PPDU or in a partial band of the UL PPDU.

7. The method of claim 1, wherein the NDPA information and the trigger information are received on a single NDPA frame.

8. The method of claim 1, wherein the NDPA frame further includes a STA info field.

9. The method of claim 8, wherein the STA info field further comprises a feedback type field indicating whether the NDP frame is UL-MU transmitted or not.

10. The method of claim 9, wherein, when the feedback type field indicates the UL MU transmission of the NDP frame, the STA info field further comprises a measuring frequency resource unit field indicative of the frequency resource information of the NDP frame and an Nc index field indicative of the spatial resource information of the NDP frame.

11. The method of claim 1, wherein the NDPA information and the trigger information are received on a single trigger frame.

12. The method of claim 11, wherein the trigger frame comprises:

a common information field comprising common information about STAs receiving the trigger frame, and a user-specific field comprising individual information about each STA receiving the trigger frame.

13. The method of claim 12, wherein the user-specific field comprises at least one of association identifier (AID) information of STAs which are to transmit the NDP frame, feedback type information indicating whether the NDP frame is UL-multi-user (MU)-transmitted or not, the frequency resource information of the NDP frame, and the spatial resource information of the NDP frame.

14. The method of claim 1, wherein the NDP frame comprises a legacy-short training field (L-STF), a legacy-long training field (L-LTF), a legacy signal (L-SIG) field, a repeated L-SIG (RL-SIG) field, a high efficiency signal (HE-SIG) A field, a high efficiency STF (HE-STF) and a high efficiency LTF (HE-LTF).

15. A station (STA) device in a wireless LAN (WLAN) system, the STA comprising:

a transceiver configured to transceive a radio signal; and a processor configured to control the transceiver, wherein the processor is further configured to:

receive, from an Access Point (AP), null data packet (NDP) announcement (NDPA) information related to an UL transmission of an NDP frame, receive, from the AP, trigger information for an UL multi-user transmission resource of the NDP frame, and UL MU-transmit, to the AP, the NDP frame using the UL MU transmission resource indicated by the trigger information, wherein the trigger information comprises at least one of spatial resource information or frequency resource information to be used for the UL MU transmission of the NDP frame, wherein the NDPA information is received on a NDPA frame, and wherein the NDPA frame includes a sounding token field for identifying a format of the NDPA frame, wherein the spatial resource information includes an index of at least one spatial stream to be used for the UL transmission of the NDP frame.

* * * * *